(12) United States Patent
Otake et al.

(10) Patent No.: US 6,671,588 B2
(45) Date of Patent: Dec. 30, 2003

(54) SYSTEM AND METHOD FOR CONTROLLING TRAVELING DIRECTION OF AIRCRAFT

(75) Inventors: Yukio Otake, Suntou-gun (JP); Kazuya Arakawa, Fujinomiya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/026,901

(22) Filed: Dec. 27, 2001

(65) Prior Publication Data

US 2003/0125848 A1 Jul. 3, 2003

(51) Int. Cl.[7] ............... B64C 13/18; B64C 25/50; G06F 15/00
(52) U.S. Cl. ................. 701/3; 701/16; 244/175
(58) Field of Search .................. 701/3, 16, 18; 244/103 R, 103 W, 111, 175, 17.13, 191, 195, 75 R, 100 R, 183; 318/583, 586, 489

(56) References Cited

U.S. PATENT DOCUMENTS

| | | | | |
|---|---|---|---|---|
| 3,678,256 A | * | 7/1972 | Harenberg, Jr. | 235/150.2 |
| 3,711,042 A | * | 1/1973 | Rempfer et al. | 244/77 D |
| 3,823,899 A | * | 7/1974 | Currey | 244/103 W |
| 4,008,868 A | * | 2/1977 | Berg | 244/111 |
| 4,221,350 A | * | 9/1980 | Moser et al. | 244/50 |
| 4,482,961 A | * | 11/1984 | Kilner et al. | 364/428 |
| 6,123,292 A | * | 9/2000 | Ralph | 244/50 |

FOREIGN PATENT DOCUMENTS

| | | |
|---|---|---|
| GB | A 2 073 114 | 10/1981 |
| JP | B2 3-58959 | 9/1991 |
| JP | B2 7-25355 | 3/1995 |
| JP | A 8-133189 | 5/1996 |
| JP | B2 2617448 | 3/1997 |

* cited by examiner

Primary Examiner—Tan Q. Nguyen
Assistant Examiner—Dalena Tran
(74) Attorney, Agent, or Firm—Oliff & Berridge, PLC

(57) ABSTRACT

The present invention is structured such that, as for travelling on the ground, there is provided a braking mechanism capable of braking wheels by the use of a single brake pedal or a braking mechanism capable of braking the wheels by flare out operation of a control stick, while automatic control of traveling direction is performed in flight using a yaw damper. In addition, a larger braking force is automatically generated, without manual operations by a pilot, for landing gear mounted on the side of an airframe toward which direction of an aircraft is to be changed as compared with the braking force applied to landing gear on the other side.

22 Claims, 15 Drawing Sheets

SYSTEM AND METHOD FOR CONTROLLING TRAVELING DIRECTION OF AIRCRAFT

BACKGROUND OF THE INVENTION

1. Field of the Invention

The present invention relates to a system and a method for controlling traveling direction of an aircraft. In particular, the present invention relates to a system and a method for controlling traveling direction of an aircraft, in which traveling direction control of an aircraft in flight is easily performed, and in which operations for directional change of an aircraft on the ground can easily be performed.

2. Description of the Related Art

In general, the following controls are performed when steering an aircraft. That is, referring to FIG. 15, a pilot performs pitching control of the aircraft by operating an elevator 91 mounted to a horizontal tail in accordance with moving a control stick 90 in a cockpit in a direction toward the front or rear of the airframe, to thereby nose up or nose down. A pilot performs rolling control of the aircraft in right and left directions by operating right and left ailerons 92 mounted to main wings in accordance with moving the control stick 90 in a cockpit in a direction toward the right or left of the airframe. Furthermore, a pilot performs yawing control of the aircraft in a rotational direction by operating a ruder 95 mounted a vertical tail by stepping on a pair of right and left rudder pedals 93 and 94 using their foot in a cockpit.

When the aircraft has landed, the pilot puts the brakes on the aircraft by actuating brakes 96 and 97 for braking landing gear wheels, which is effected by stepping on the rudder pedals 93 and 94, similar to operating a brake pedal in an automobile, thereby slows down the aircraft.

In this case, once the aircraft has been decelerated to a predetermined speed after it has landed, it is necessary to change the direction of travel of the aircraft when moving it to a necessary location within an airport for parking or the like. Here, the pilot applies braking to either the left or the right wheels by stepping on either the rudder pedal 93 or 94, and the aircraft thus turns toward the direction in which braking is applied, thereby changing the direction of travel of the aircraft.

In all present-day aircraft, regardless of whether they are large size aircraft such as a long-range jet, fighter, or small size aircraft such as a Cessna, either one of the pair of right and left rudder pedals is operated by stepping on it as stated above when it becomes necessary to change the direction of the aircraft that is moving at a predetermined speed on the ground after landing or before takeoff. Directional changes of the aircraft are performed when moving on the ground before takeoff or after landing by thus performing braking operations to either the right or left side wheels. The workload required by the pilot in steering can be reduced, if such aircraft direction change operation can be performed without using the pair of right and left rudder pedals.

Furthermore, autopilot systems are installed in large size aircraft such as a long-range jet. The autopilot system is one in which control of traveling direction of the aircraft in flight is performed automatically by an apparatus, including yawing control performed by an auto rudder mechanism that automatically performs the aforementioned rudder operations. This type of autopilot system has not yet become popular for small aircraft such as a Cessna, and therefore it is necessary for the pilot to manually perform yawing control by operating the rudder pedals in flight.

This type of yawing control of the aircraft effected by operating the rudder pedals 93 and 94 prevents the altitude from dropping while the aircraft slips in a horizontal direction when the airframe is turning or when it is tilted due to a strong wind, so-called "side slip", for example. Thus the aircraft is turned in a stable state. And the traveling direction control of the aircraft is performed to ensure a correct traveling direction by suitably moving the rudders. These are essential operations in controlling the direction of travel of the aircraft.

However, the sensibility as a human of a pilot with respect to such sideslip of aircraft is very delicate. An extremely large amount of time is required during training in mastering this as a pilot, and it is necessary to perform rudder operations based upon this delicate sensibility by stepping on the rudder pedals 93 and 94. Yawing control operations using the rudders are therefore extremely complex for the pilot.

Consequently, it has long been desired to lower the load placed upon the pilot during control by automating such yawing control of the aircraft that uses rudder operations.

SUMMARY OF THE INVENTION

An object of the present invention is to reduce the workload of a pilot relating to aircraft control.

Furthermore, another object of the present invention is to perform automatic braking and directional change of an aircraft after landing and before takeoff, thereby reducing the workload on a pilot relating to aircraft steering after landing and before takeoff.

In addition, another object of the present invention is to prevent malfunction of a braking mechanism when changing the direction of an aircraft after landing and before takeoff, thus performing braking and directional change of aircraft safely and surely.

Another object of the present invention is to reduce the workload of a pilot on an aircraft, in particular a small aircraft, which is required for yawing control in steering in flight, and by combining this with each of the aforementioned objects, reducing the workload on a pilot for controlling an aircraft by using his or her feet.

In order to accomplish these objectives, the present invention is structured such that control of traveling direction is performed automatically using a yaw damper mechanism in flight, and when braking of an aircraft in motion on the ground is performed, that braking is performed by operating one—single brake pedal provided in cockpit and capable of controlling the braking of the aircraft. Further, control of traveling direction of an aircraft is performed by automatically generating a larger braking force for landing gear wheels on a side toward which the aircraft will change direction as compared with that applied to landing gear wheels on the other side, when performing directional change of an aircraft on the ground.

The present invention is structured such that braking control is automatically performed when an aircraft is traveling at a speed equal to or greater than a predetermined speed after an aircraft has landed. And thus if the speed of the aircraft has been reduced to less than the predetermined speed, then a braking force is generated to landing gear wheels on a side toward which the aircraft will change direction, which is larger than the braking force generated to landing gear wheels on the other side. Control of traveling direction of the aircraft is thus performed.

In addition, the present invention is structured such that the speed of the aircraft is increased during directional change of the aircraft by automatically generating engine thrust, thus making directional change possible in a short time, for cases in which, as described above, control of traveling direction is performed by generating a braking force for landing gear wheels on a side toward which the aircraft will change direction which is larger than the braking force acting on the landing gear wheels on the other side.

In view of the above, according to a first aspect of the present invention, there is provided a system for controlling traveling direction of an aircraft that is installed with a pair of landing gear on right and left sides of its air frame. When operating a control stick in right or left directions of the airframe, a larger braking force is applied to landing gear wheels mounted on a side toward which a control stick is operated, as compared with a braking force acting on landing gear wheels mounted on the other side.

Therefore, according to the present invention, if the control stick is operated to either the right or left side direction of the airframe of the aircraft, a larger braking force acts on one side of the landing gear, in the direction of which the control stick is operated, than that acting on landing gear on the other side. The aircraft thus turns in the direction to which the control stick is operated.

As a result, control of traveling direction of an aircraft can also be performed on the ground, in working together with the operation of the control stick, according to the present invention.

According to a second aspect of the present invention, there is provided a system for controlling traveling direction of an aircraft that is installed with a plurality of landing gear on right and left sides of its airframe. The system for controlling traveling direction comprises a detection means capable of detecting an operation state of a control stick, and a braking mechanism capable of supplying braking force to each of the plurality of landing gear wheels on the right and left sides. A larger braking force is supplied by the braking mechanism to landing gear wheels on a side toward a direction of which the control stick is operated than is supplied to landing gear wheels on the other side, based upon the operation state of the control stick detected by the detection means, for cases in which the control stick is operated toward the right and left side directions of the airframe.

Further, according to a third aspect of the present invention, a single brake pedal is installed within a cockpit of an aircraft, which is capable of performing braking of a pair of landing gear wheels mounted on the right and left sides of the airframe. Braking of the aircraft is performed by operating the single brake pedal.

Therefore, according to the present invention, braking of the aircraft can be performed by a pilot stepping on the single brake pedal if braking of the aircraft is necessary when in motion on the ground.

Steering control of the aircraft on the ground can therefore be made easier, because it is not needed to be performed braking operations of the aircraft by stepping on the pair of right and left side brake pedals with both feet, as is performed conventionally.

According to a fourth aspect of the present invention, for cases in which a detection means that is capable of detecting the operation state of the control stick detects flare out operation as an aircraft lands, braking of a plurality of landing gear wheels mounted on the right and left sides of an airframe is performed on condition that flare out operation of a control stick was taken.

The term "flare out" operation refers to an operation performed by pulling the control stick toward the pilot side in order to pull up a nose when the aircraft is landed.

Therefore, according to the present invention, braking force is supplied to right and left landing gear wheels, if flare out operation of the control stick is performed in order to pull up the nose by the pilot when the aircraft is landed taken as a prerequisite condition, and the aircraft is thus braked. As a result, according to the present invention, braking operations using the control stick become possible, without performing braking operations effected by the pilot stepping on rudder pedals as is conventionally done.

Steering control of the aircraft is therefore made even easier because directional change of the aircraft becomes possibly by the pilot operating only the control stick during a period from landing until parking the aircraft. And thus the load required to control the aircraft, when landing and after landing, can be reduced.

Further, although the aforementioned flare out operations of the control stick are also performed when the aircraft takes off, braking the plurality of the landing gear wheels mounted on the right and left sides of the airframe is not performed.

Moreover, According to a fifth aspect of the present invention, the system is further provided with detection means capable of detecting the speed of an aircraft. A larger braking force can be made to act on landing gear wheels on a side toward which a control stick is operated, as compared with that acting on landing gear wheels on the other side, for cases in which the aircraft=speed of the aircraft is judged to be equal to or less than a predetermined speed based upon speed information detected by the detection means.

Here, the term "predetermined speed" refers to both "airspeed" and "ground speed". The term "airspeed" refers to a relative speed of an aircraft with respect to the surrounding air, measured by a Pitot-Static System installed in the airframe of the aircraft. Further, the term "ground speed" denotes a relative speed of the aircraft with respect to the surface of the ground. The aircraft speed is basically judged by the ground speed, but the speed of the aircraft_may also be measured using the airspeed. In addition, the term "predetermined speed" as described herein specifically refers to a speed on the order of 20 km/hr.

Therefore, in accordance with the present invention, when the aircraft moves at a speed equal to or less than the predetermined speed on the ground, then a larger braking force acts on landing gear wheels on the side toward which the control stick is operated than acts on the landing gear wheels on the side toward which the control stick is not operated, if the pilot operates the control stick toward the right or left side of the airframe when heading for a parking area.

As a result, according to the present invention, with a prerequisite condition that a speed of the aircraft has reached a predetermined speed, braking control is performed for changing the direction of travel of the aircraft by operating the control stick, and then the direction of travel of the aircraft changes to the direction in which the control stick is operated.

Further, a larger braking force acts on the landing gear on the side toward which the control stick is operated than that on the other side, only when the aircraft speed is equal to or less than a predetermined speed. Therefore, for example, if the aircraft lands while receiving a cross wind, then the aircraft descends while being maintained in balance by the control stick being operated in the right or left direction. In this situation, since the speed of the aircraft is equal to or greater than a predetermined value, an unstable situation in which, for example, the aircraft touches down at landing while braking is being applied to either of the pair of landing gear wheels can be prevented.

In accordance with a sixth aspect of the present invention, the system further comprises the detection means capable of detecting the housing state of a landing gear housing. If it is determined the landing gear to be projected from an airframe based on information detected by the detection means, then a larger braking force is made to act on landing gear wheels on a side toward which a control stick is operated, as compared with that acting on landing gear wheels on the other side.

Therefore, according to the prevent invention, if an aircraft is of a type in which the landing gear is housed within the airframe, for example, with a prerequisite condition that that the landing gear has been projected from the fuselage or the main wing and thus a condition for landing has been made, a larger braking force is made to act on the landing gear wheels on the side toward which the control stick is operated than that on the other side.

In accordance with a seventh aspect of the present invention, the system comprises a detection means capable of detecting a speed of the aircraft and a detection means capable of detecting a landing gear housing state. A larger braking force can act on landing gear wheels on a side toward which a control stick is operated than that acting on landing gear wheels on the other side, when it is determined that the landing gear is projected from the airframe and the aircraft travels at or below the predetermined speed, based upon information from both of the detection means.

Therefore, in accordance with the present invention, Control of directional change is preformed based on the condition that landing gear is projected from the airframe and the speed of the aircraft is equal to or less than the predetermined speed.

As a result, according to the present invention, when the aircraft has landed and has been braked while running on the ground such that its speed is decelerated to equal to or less than the predetermined speed, the larger braking force acts on landing gear wheels disposed on the side toward which a pilot wants to change direction by operating the control stick than the braking force acting on the landing gear wheels on the other side. Change of direction thus becomes possible toward the side applied with larger braking force.

In accordance with an eighth aspect of the present invention, the system further comprises the detection means capable of detecting engine throttle opening. For cases in which it is determined that the engine throttle opening is equal to or less than a predetermined value based on information output from the detection means, a larger braking force can apply to landing gear wheels on a side toward which a control stick is operated than the braking force applied to landing gear wheels on the other side.

Therefore, according to the present invention, determination of whether or not to perform direction change control is made based on whether or not the throttle opening is equal to or less than a predetermined value.

In addition to the judging condition based on the speed of the aircraft, the judging condition based on the throttle opening can be used as an independent condition. The throttle opening is small at landing, and the throttle opening is large at takeoff. In addition, braking control of the aircraft is not necessary when takeoff.

Therefore, if the judgment condition relating to the throttle opening is thus used as an independent condition in addition to the judgment condition relating to the speed of the aircraft, then braking control will not be performed on the aircraft when the throttle opening is larger than a predetermined value.

In accordance with a ninth aspect of the present invention, the system further comprises detection means capable of detecting aircraft engine manifold pressure. A larger braking force can be made to act on landing gear wheels on a side toward which a control stick is operated as compared with that applied to landing gear wheels on the other side, for cases in which the manifold pressure is determined to be equal to or less than a predetermined value based on information detected by the manifold pressure detection means.

According to the present invention, therefore, the aircraft is determined to have landed when the engine manifold pressure is equal to or less than a predetermined value, because the engine power has also become lower in such a case. Braking control of the aircraft is then performed.

In this case the judgment condition relating to whether or not the engine manifold pressure is equal to or less than a predetermined value, and the judgment condition relating to whether or not the throttle opening is equal to or less than a predetermined value can be provided independent of each other. If the judgment condition relating to whether or not the engine manifold pressure is equal to or less than a predetermined value, and the judgment condition relating to whether or not the throttle opening is equal to or less than a predetermined value are thus made independent of each other, then the landing state of the aircraft is determined and braking control can appropriately be performed even when the detection means for detecting throttle opening is operating incorrectly. A fail-safe system can be thus attained, and simplification of aircraft control and safety of aircraft control can both be achieved.

In accordance with a tenth aspect of the present invention, a working pressure supplied to a braking mechanism for landing gear wheels mounted on a side to which a control stick is operated is larger than a working pressure supplied to a braking mechanism for landing gear wheels mounted on the side opposite to the side to which the control stick is operated.

Therefore, according to the present invention, when the control stick is operated, a larger braking force acts on the wheels of the landing gear installed on the side to which the aircraft is to turn, as compared with the braking force acting on the wheels of the landing gear installed on the opposite side. The aircraft then thus changes direction to the direction in which the control stick is operated.

In accordance with an eleventh aspect of the present invention, the working pressure applied to a braking mechanism for landing gear wheels mounted on a side that is opposite to the side to which a control stick is operated is set to become less than the working pressure applied to a braking mechanism for landing gear wheels mounted on the side to which the control stick is operated, if the single brake pedal mentioned above has been stepped on and the speed of an aircraft has become equal to or less than the predetermined speed.

Therefore, according to the present invention, a smaller braking force acts on the landing gear wheels mounted on the side that is opposite to the side to which the airframe is to turn, as compared with the braking force acting on the landing gear wheels mounted on the side to which the airframe is to turn, for cases in which braking has been performed by stepping on the single brake pedal while the pilot also operates the control stick. As a result, the braking force acting on the landing gear wheels on the side to which the control stick is operated becomes larger than that on the other side, and the aircraft changes direction to the direction in which the control stick is operated.

According to a twelfth aspect of the present invention, the detection means for detecting the stepping operation of the single brake pedal is provided. The working pressure applied to a braking mechanism for landing gear wheels mounted on a side that is opposite to the side toward which a control stick is operated is set to become lower than the working pressure applied to a braking mechanism acting on landing gear wheels mounted on the side to which the control stick is operated, when it is determined by the detection means that the brake pedal has been stepped on and braking has been thus effected.

Therefore, according to the present invention, the lower working pressure is supplied to the braking mechanism for the landing gear wheels mounted to the side opposite to the direction in which the control stick is operated than the working pressure supplied to the braking mechanism for the landing gear wheels mounted on the side to which the control stick is operated, with the condition that the single brake pedal has been stepped on.

As a result, the fact that the brake pedal has been stepped on in order to actuate the braking mechanisms is additionally taken as a condition, compared to the case of actuating the braking mechanisms based solely on the predetermined speed. Therefore a situation such that when the detection means for detecting the speed of the aircraft is not operating correctly, for example, braking mechanism are actuated while performing directional change, at a speed higher than the speed at which the braking mechanisms must be actually actuated so that the aircraft is placed in an unstable state, can be prevented. An automatic directional change control of the airframe can thus be more safely performed.

Further, according to a thirteenth aspect of the present invention, the engine throttle opening is controlled to become larger when a braking force acting on landing gear wheels mounted on a side to which a control stick is operated is larger than the braking force acting on landing gear wheels mounted on the opposite side, based upon information from the detection means capable of detecting operation of the control stick.

Therefore, according to the present invention, the speed during directional change of an aircraft is increased and quick directional change thus becomes possible, because the engine throttle opening is made larger and a thrust force is increased thereby, when the braking force acting on the landing gear wheels mounted on the side to which the control stick is operated becomes larger than the braking force acting on the landing gear wheels mounted on the opposite side to thereby effect the directional change.

According to a fourteenth aspect of the present invention, a single braking pedal capable of supplying braking force to the wheels installed on landing gear is mounted within a cockpit of an aircraft instead of rudder pedals, and a yaw damper mechanism is installed in an aircraft so that automatic yawing control is performed by a rudder installed in a vertical stabilizer of the aircraft while the aircraft is in flight.

According to the present invention, conventional rudder pedals are not provided in the cockpit but the single brake pedal is installed instead. Braking operation after landing is therefore performed by operating the single brake pedal, and yawing control in fright is performed by automatically controlling the rudder on the vertical stabilizer by using of the yaw damper mechanism.

As a result, it is not necessary for a pilot to perform rudder operations using conventional rudder pedals in order to perform yawing control in flight, and the amount of time required for mastering rudder pedal operations can be eliminated. In addition, braking a plurality of landing gear wheels mounted on the right and left sides of the airframe can be performed by operating the single brake pedal when the aircraft is moving or taxing on the ground. The workload on the pilot for aircraft control operations can thus be greatly reduced.

According to a fifteenth aspect of the present invention, the detection means capable of detecting the operation state of a control stick is capable of detecting the direction in which control stick is operated as well as the amount of which control stick is operated. Braking force is applied to braking mechanisms for wheels mounted to the landing gear on the right and lift sides of an airframe, based upon information relating to the direction in which the control stick is operated and the amount of which the control stick is operated if the control stick is operated to the right or left side of the airframe.

Therefore, according to the present invention, the detection means detects the direction in which the control stick is operated and the amount of which the control stick is operated when a pilot has operated the control stick by a predetermined angle in a direction to the right or left side of the airframe. Braking force is then applied to braking mechanisms for the landing gear wheels mounted on the right and left sides of the airframe based upon information relating to the detected direction in which the control stick is operated and amount of which the control stick is operated.

Therefore, according to the present invention, a suitable amount of braking force can thus be supplied to the landing gear wheels on the side to which the control stick is operated, corresponding to the amount of control stick operation. The pilot can therefore made directional changes of the aircraft by a desired angular amount, in the right or left directions in which the pilot wants to change.

According to a sixteenth aspect of the present invention, there is provided a method of controlling a direction of travel of an aircraft that is installed with a plurality of landing gear on the right and left sides of its airframe, the method comprising the steps of: detecting a direction of operation and an amount of operation of a control stick which is performed by a pilot in a direction to the right or left side of the airframe; detecting the speed of the aircraft; and determining whether or not the speed of the aircraft is equal to or less than a predetermined value. If the speed of the aircraft is less than or equal to the predetermined value, the method further comprises the following steps of: determining, based on the direction of operation of the control stick, to which side of the aircraft the direction of travel is to be changed; computing an amount of brake operation based on the amount of operation of the control stick; and supplying the computed amount of braking to landing gear wheels mounted on the side of the airframe to which the direction of travel is to be changed.

Further, according to a seventeenth aspect of the present invention, there is provided a method of controlling the direction of travel of an aircraft, further comprising a step of detecting a displacement direction and a displacement amount of the aircraft in a yawing direction of the airframe. The method further comprises, if it is determined that the speed of the aircraft is larger than the predetermined value, the step of computing an amount of rudder operation based on the displacement direction and the displacement amount of the aircraft in the yawing direction, and then operating the rudder based on the amount of rudder operation.

According to an eighteenth aspect of the present invention, there is provided a method of controlling the direction of travel of an aircraft, further comprising a step of computing an amount of throttle opening increase based upon the direction and the amount of the control stick operation by the pilot in the right or left directions of the airframe. For cases in which the computed amount of braking operation is supplied to the landing gear wheels on the side to which the aircraft is to change its direction of travel, the throttle opening is controlled based on the computed amount of throttle opening increase.

According to a nineteenth aspect of the present invention, there is provided a method of controlling direction of travel of an aircraft to which a plurality of landing gear wheels are installed on the right and left sides of an airframe, the method comprising the steps of: detecting a direction of operation and an amount of operation of a control stick performed by a pilot in a direction to the right or left side of the airframe; detecting the speed of the aircraft; detecting that braking operations have been performed by the pilot; and determining whether or not the speed of the aircraft is equal to or less than a predetermined value. Method further comprises the steps of: determining, based on the direction of operation of the control stick, to which side of the aircraft the direction of travel is to be changed—for cases in which the speed of the aircraft is less than or equal to the predetermined value and if it is detected that the above braking operations have been performed; computing an amount of braking pressure reduction based on the amount of operation of the control stick, if the above braking operations have been performed; and supplying the computed amount of braking pressure reduction to landing gear wheels mounted on the side of the airframe that is opposite to the side to which the direction of travel is to be changed.

According to a twentieth aspect of the present invention, there is provided a method of controlling direction of travel of an aircraft to which a plurality of landing gear are installed on the right and left sides of an airframe, further comprising a step of computing the amount of throttle opening increase based on the direction and amount of the control stick operation performed by a pilot in the right or left direction of the airframe. A throttle opening is controlled based on the computed throttle opening increase amount when the computed amount of braking pressure reduction is supplied to the landing gear wheels mounted on the side of the airframe that is opposite to the side to which the direction of travel is to be changed.

According to a twenty-first aspect of the present invention, there is provided a method of controlling direction of travel of an aircraft that is installed with a plurality of landing gear on the right and left sides of its airframe, the method further comprising the steps of: detecting an amount of flare out operation of the control stick by the pilot; detecting a throttle opening; determining whether or not the throttle opening is equal to or larger than a predetermined value; and computing an amount of braking operation based on the amount of flare out operation when the throttle opening is equal to or less than a predetermined value and the speed of the aircraft is equal to or greater than a predetermined value. The computed amount of braking operation is supplied to all of the landing gear wheels mounted on the right and left sides of the airframe.

According to a twenty-second aspect of the present invention, there is provided a method of controlling direction of travel of an aircraft to which a plurality of landing gear are installed on the right and left sides of an airframe, the method further comprising the steps of: detecting engine manifold pressure; determining whether or not the throttle opening is equal to or greater than a predetermined value; determining whether or not the engine manifold pressure is equal to or less than a predetermined value for cases in which the throttle opening is judged to be equal to or larger than the predetermined value; and computing an amount of braking operation based on the amount of flare out for cases in which the throttle opening is equal to or larger than the predetermined value of throttle opening, the engine manifold pressure is equal to or less then the predetermined value of engine manifold pressure, and the speed of the aircraft is equal to or larger than a predetermined value. The computed amount of braking operation is supplied to all of the landing gear wheels mounted on the right and left sides of the airframe.

DETAILED DESCRIPTION OF THE PREFERRED EMBODIMENTS

The present invention is explained in detail below based on embodiments shown in the attached figures.

Figure 1:
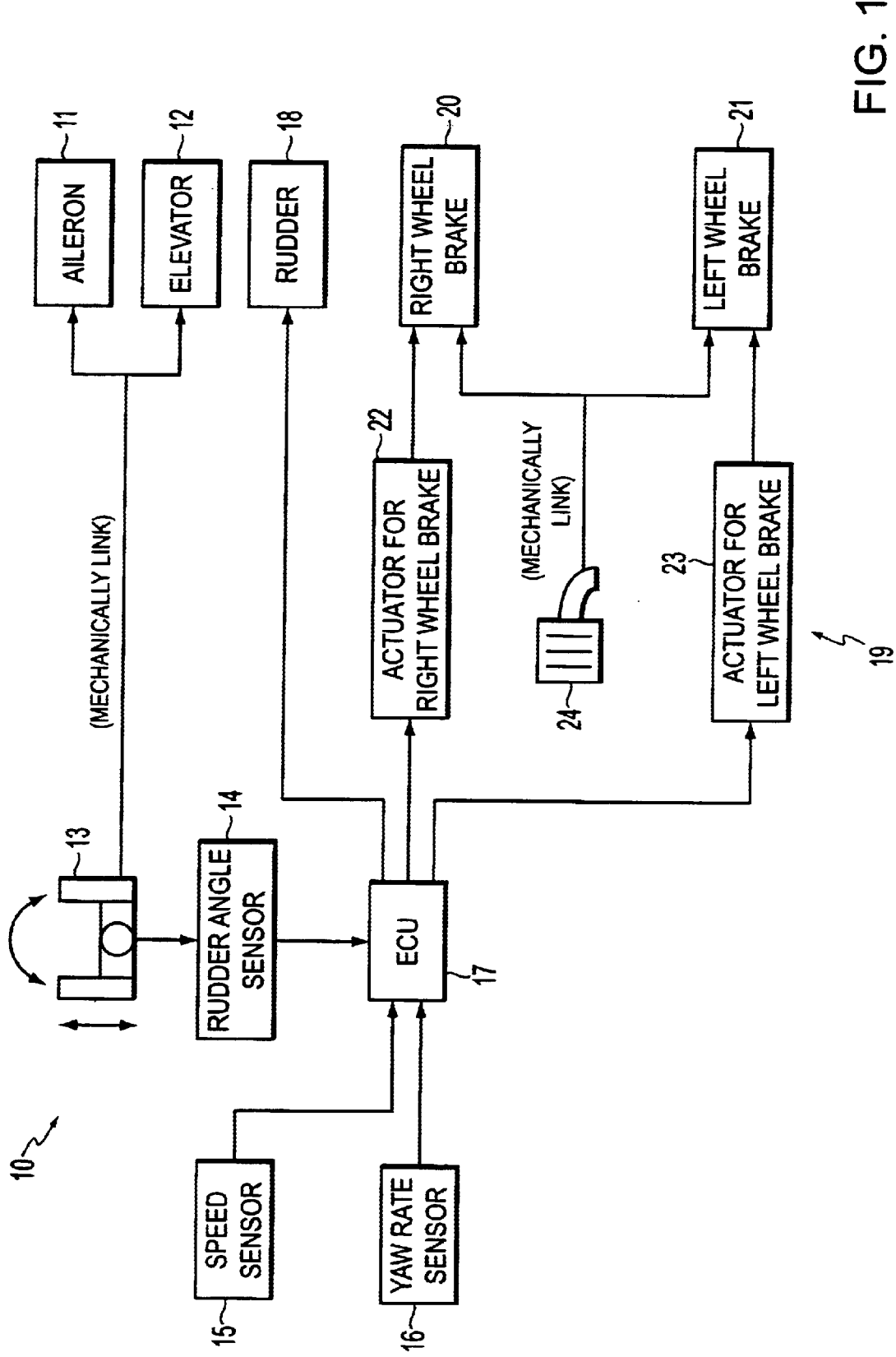
FIG. 1 is a system schematic diagram showing a first embodiment of a system for controlling traveling direction of an aircraft according to the present invention.

As shown in FIG. 1, a system for controlling traveling direction of an aircraft of this embodiment is a system for controlling the direction of travel of an aircraft in which a pair of landing gear is mounted to right and left sides of an airframe. The control system is structured so that a larger braking force acts on landing gear wheels on a side to which a control stick is operated than a braking force acting on other landing gear wheels for cases in which the control stick is operated in directions to the right and left of the airframe.

That is, the system for controlling an aircraft traveling direction 10 is provided with: a control stick 13 mechanically linked to ailerons 11 formed in main wings of the airframe and elevators 12 formed in horizontal tail and is capable of operating the ailerons 11 and the elevators 12, which is installed in a cockpit of an airframe; a rudder angle sensor 14 used as detection means for detecting a direction of operation and an amount of operation of the control stick 13; a speed sensor 15 used as detection means for detecting the speed of the aircraft; a yaw rate sensor 16 for detecting a direction of movement and an amount of movement in a yawing direction of the airframe, which constitutes a yaw damper mechanism; an ECU 17 for processing information from the rudder angle sensor 14, the speed sensor 15 and the yaw rate sensor 16, and for controlling the motion of a rudder 18 and the motion of later described actuators 22 and 23 used for right and left wheel brakes; the rudder 18, which is controlled to move based on commands from the ECU 17, formed on a vertical tail, and a travel control mechanism 19 capable of braking the aircraft and lowering the travel speed of it, and capable of changing the direction of travel of the aircraft, for cases in which an aircraft is traveling on the ground.

The travel control mechanism 19 is structured so as to be capable of supplying braking forces to wheel brakes 20 and 21, mounted to landing gear formed in pairs on the right and left sides of the airframe, at the same time, by mechanical linking to them. A single brake pedal 24 installed within the cockpit instead of conventional rudder pedals, and a actuator for a right wheel brake 22 and a actuator for a left wheel brake 23 capable of supplying driving force to both of the wheel brakes 20 and 21 based on commands from the ECU 17 are prepared.

Further, the yaw damper mechanism is structured by the yaw rate sensor 16, the ECU 17 which processes information detected by the yaw rate sensor 16, and an actuator that drives the rudder 18 in accordance with commands from the ECU 17. Therefore, yawing control of the aircraft is performed in this embodiment by detecting a displacement direction and a displacement amount of the aircraft in the yawing direction of the airframe by using the yawing rate sensor 16, processing the detected information by using the ECU 17, automatically moving the rudder 18 by outputting a predetermined rudder angle value for the rudder 18 to an actuator (not shown in the figure) for the rudder 18, so that the angular velocity in the yaw direction of the airframe becomes zero. With the system for controlling an aircraft traveling direction 10 in this embodiment, rolling and pitching control of the aircraft in flight is performed by the pilot operating the control stick 13, controlling the ailerons 11 and the elevators 12 thereby.

As a result, although conventionally the pilot suitably moves the rudder in fright by stepping on either of the right or left rudder pedals formed in a pair using his or her foot, preventing sideslip of the aircraft or performing control of traveling direction so as to turn the aircraft in a stable state or ensure a correct direction of travel, in accordance with this embodiment, it is not necessary to perform such delicate operations of the rudder pedals by using one's feet. Since the pilot need perform only rolling and pitching control operations by operating the control stick in flight, the workload on the pilot relating to steering control in flight can be greatly reduced.

Further, by stepping on the single brake pedal 24, the pilot can operate the brakes 20 and 21 on both wheels and perform braking of the aircraft when it is necessary to reduce the aircraft speed after the aircraft has landed at an airport or when the aircraft is traveling to a runway before takeoff. After the speed of the aircraft has been reduced and reached a predetermined speed, the pilot operates the control stick 13 in the right or left direction when it is necessary to perform directional change of the aircraft.

In this case the rudder angle sensor 14 detects the operation direction and the operation amount of the control stick 13, and transmits the detected information to the ECU 17. The ECU 17 determines what level of movement must be sent as a command to either of the actuator for right or left wheel brake 22 or 23 based on the information from the rudder sensor 14 relating to the direction and amount of operation of the control stick 13.

The ECU 17 outputs a movement command to the actuator for wheel brake 22 or 23, to the one on the side to which the pilot has operated the control stick 13, for generating a necessary amount of braking force in the wheel brakes 20 and 21 in order to change the direction of the aircraft as desired by the pilot.

As a result, by the actuator for a wheel brake 22 or 23 on the side to which the pilot has operated the control stick 13, the either of the left or right wheel brake is operated and a necessary amount of braking is applied to the wheel thereby. The aircraft changes direction toward the side to which braking is applied.

Figure 2:
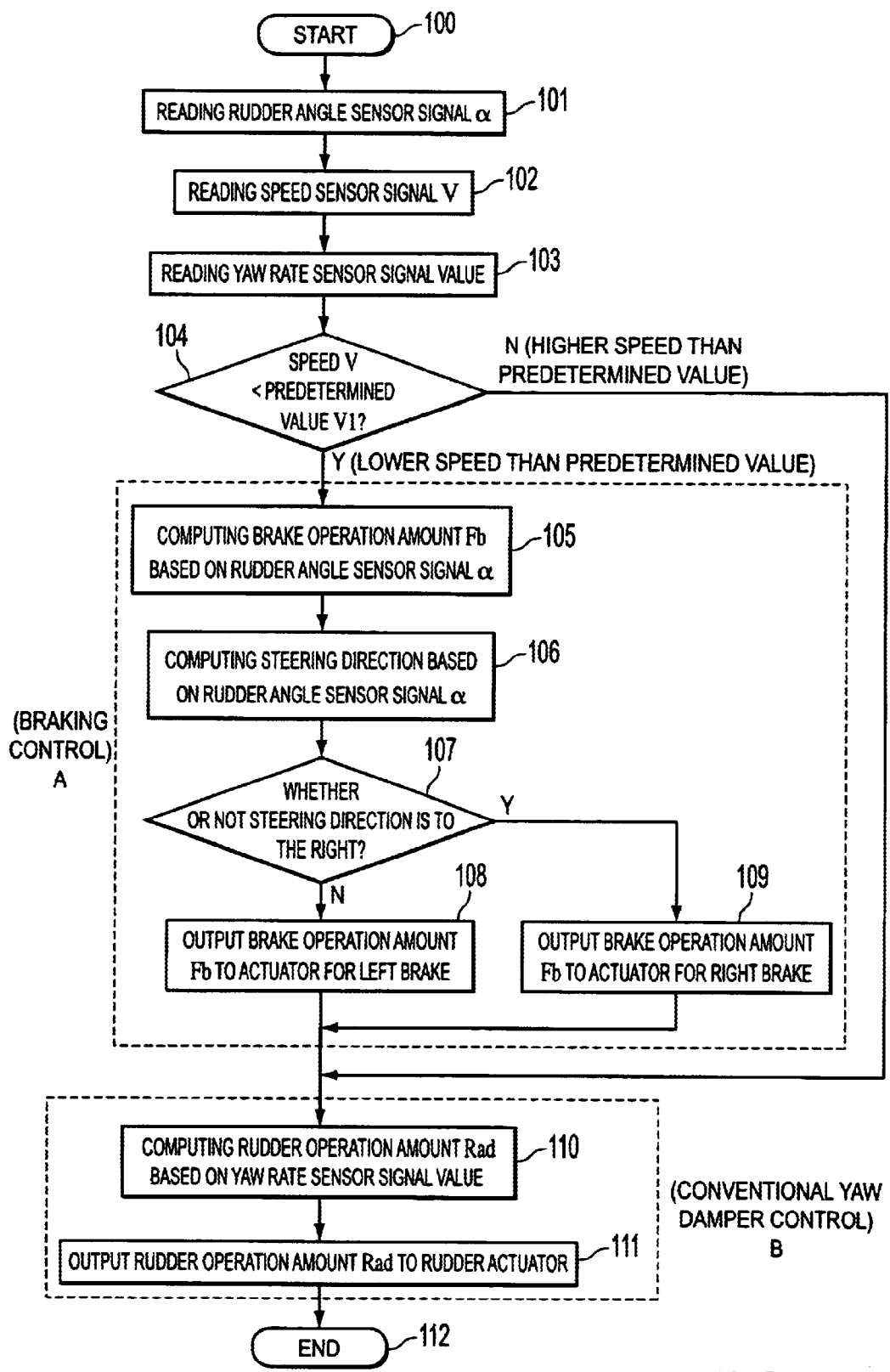
FIG. 2 is a flow chart showing system operation states of the first embodiment of the system and a method for controlling traveling direction of an aircraft according to the present invention.

Next, operation of the system for controlling an aircraft traveling direction 10 of this embodiment is explained based upon a flow chart shown in FIG. 2.

If a switch for operating the aircraft traveling direction control system is in an on state, then a routine shown in the flowchart begins. The routine then is repeated ordinarily from a start to an end at an extremely short cycle time (for example, every $1/100$ second) when in an operating state.

The aircraft traveling direction control system can also be structured so as to operate if an engine ignition switch of the aircraft is in an on state. It is therefore possible to operate the system for controlling an aircraft traveling direction which is operated in this routine both when the aircraft is moving from an apron to a runway for takeoff, and when the aircraft is moving to the apron after landing.

For example, when the pilot turns the engine ignition switch on, this routine starts (step 100) and then the rudder sensor 14, the speed sensor 15, the yaw rate sensor 16, and the ECU 17 are placed in an operational state. The actuators for wheel brake 22 and 23 also placed in a state of operation preparation.

The rudder sensor 14 detects the direction of operation and the amount of operation of the control stick 13, and outputs a rudder angle sensor signal α to the ECU 17 for cases in which the pilot operates the control stick 13 in a direction to the right or left of the airframe (step 101). Further, the speed sensor 15 detects an speed of the aircraft V at the appropriate point, and outputs the speed of the aircraft V to the ECU 17 (step 102). The yaw rate sensor 16 detects displacement direction and displacement amount of the aircraft in a yawing direction of the airframe at the appropriate point, and outputs a yaw rate sensor signal value to the ECU 17 (step 103).

The ECU 17 determines whether or not the speed V at the appropriate point, input from the speed sensor 15, is larger than a predetermined value V1 that is a basis of whether or not the travel control mechanism 19 operates. In this case the term "predetermined value V1" denotes, for example, a speed on the order of 20 km/hr.

After comparing the two values, if the speed V at the appropriate point is judged to be larger than V1, the ECU 17 judges that the airframe is not in a state of braking, for example it is running at high speed along the runway in order to take off, or the airframe has taken off and is currently in flight, so that it is not necessary for the travel control mechanism 19 to operate. A braking control routine A is bypassed, and then processing moves to a yaw damper control routine B.

In the yaw damper control routine B, the ECU 17 computes a rudder operation amount Rad based on the signal value of the yaw rate sensor 16 (step 110), and outputs the rudder operation amount Rad to the rudder 18 actuator (step 111). As a result, the rudder 18 is moved by a predetermined angular amount in a predetermined direction by the yaw damper mechanism, and control of traveling direction of the aircraft in the yawing direction of the airframe is performed automatically without the pilot operating the rudder pedal.

The control of traveling direction of the aircraft in the yawing direction of the airframe is performed by controlling the angular velocity in the yawing direction of the airframe to be zero based on the signal value of the yaw rate sensor 16. This is the same as conventionally used yaw damper control performed by an autopilot apparatus that is installed in large size aircraft such as a long-range jet.

In step 104, on the other hand, it is determined that the airframe is running on the ground with slowing down after landing by being braked to by the single brake pedal 24 being operated, for example, or is traveling at low speed toward the runway for takeoff, or the like, for cases in which the ECU 17 determines that the speed V is less than the predetermined value V1 which is standard. Processing then moves to the braking control routine A.

In the braking control routine A, the ECU 17 first computes a brake operation amount Fb based on the input rudder angle sensor signal α (step 105). Next, a steering direction is determined similarly based on the rudder angle sensor signal α (step 106). A determination is then made as to whether or not the steering direction is to the right of the aircraft traveling direction (step 107). If the steering direction is to the right, then the calculated brake operation amount Fb is output to the brake actuator on the right side of the airframe (step 109). A braking force is thus generated with respect to landing gear wheels on the right hand side of the airframe, and therefore the aircraft changes direction to the right of the direction of travel.

Further, for cases in which the ECU 17 determines that the steering direction is not to the right in the step 107, the calculated brake operation amount Fb is output to the brake actuator on the left side of the airframe (step 108). A braking force is thus generated with respect to landing gear wheels on the left hand side of the airframe, and therefore the aircraft changes direction to the left of the direction of travel.

In this case it is judged in the step 104 that the speed of the aircraft is equal to or less than the predetermined value V1, and thus yaw damper control is not necessary. Therefore the yaw damper control routine B is passed, and control in accordance with this routine is completed (step 112).

In the mentioned above, because it is judged whether or not the braking control A is performed, based on whether or not the speed V is less than the predetermined value V1 which is standard, although, for example, descent and landing is performed while operating control stick to the right or left when landing takes place in a cross wind, it can be prevented that a situation in which braking acts, before landing, on the landing gear wheels on the side to which the control stick is operated.

Figure 3:
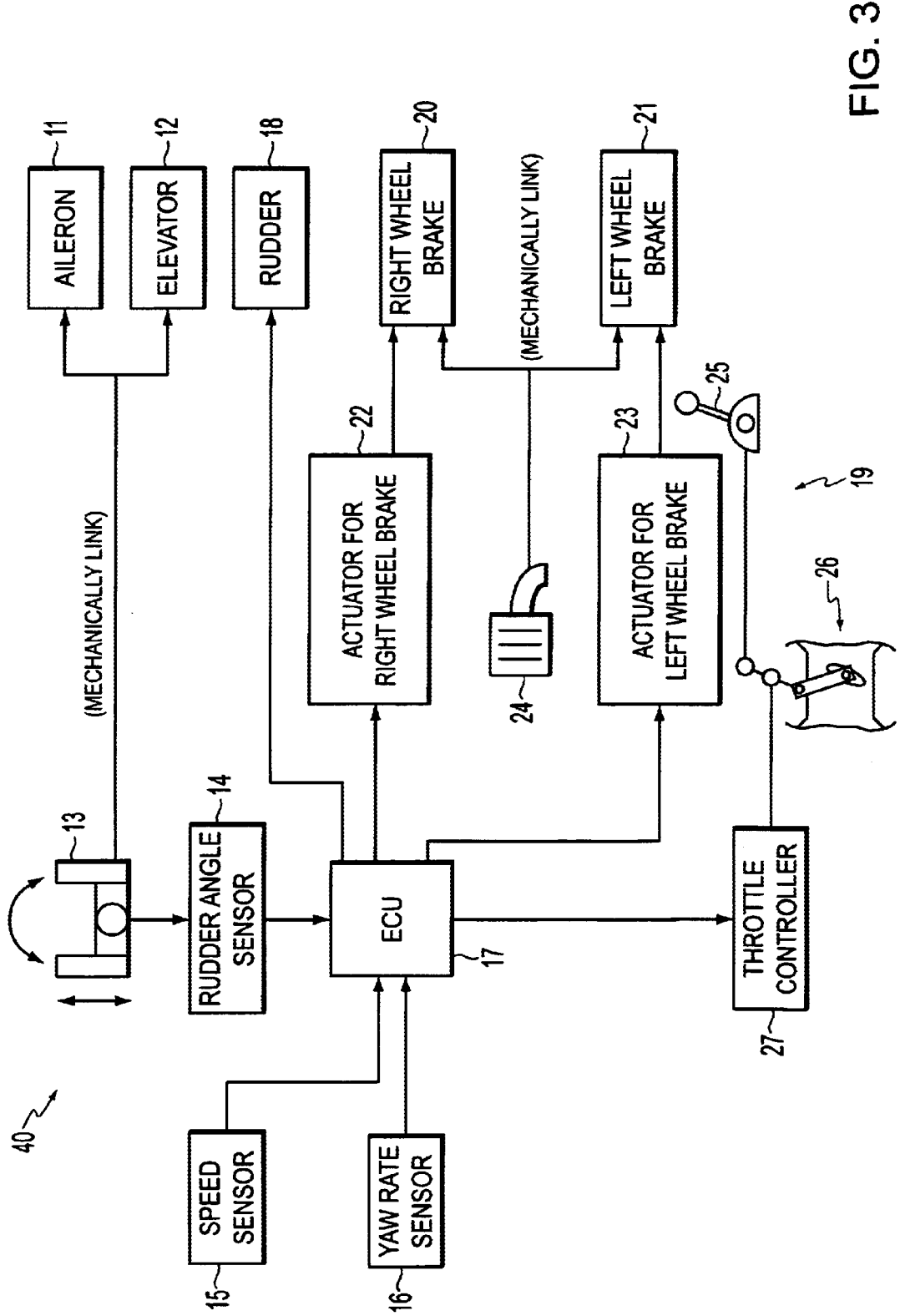
FIG. 3 is a system schematic diagram showing a second embodiment of a system for controlling traveling direction of an aircraft according to the present invention.

FIG. 3 shows second embodiment of the system for controlling an aircraft traveling direction in accordance with the present invention. An aircraft traveling direction control system 40 of the second embodiment is based on the structure of the aircraft traveling direction control system 10 of the first embodiment. In addition, a throttle controller 27 is also established in the travel control mechanism 19. The throttle controller 27 is capable of controlling an engine throttle opening so as to become larger for cases in which a larger braking force applied to landing gear wheels mounted on a side of the airframe to which the control stick 13 is than the braking force applied to landing gear wheels mounted on the opposite side.

The throttle controller 27 is structured to be capable of automatically controlling a throttle 26 that is operated manually by a pilot using a throttle lever 25. The throttle controller 27 is operated in accordance with a command from the ECU 17. Other structures are the same as those of the aircraft traveling direction control system 10 of the first embodiment.

A braking force is therefore generated in the second embodiment to the wheel brakes 20 and 21 by the pilot stepping on the single brake pedal 24 for cases in which it is necessary to reduce the speed of the aircraft while traveling on the ground. If the ECU 17 determines that the speed of the aircraft has been reduced by the predetermined speed, based on information from the speed sensor 15, then the ECU 17 emits a command, capable of making generate a necessary amount of braking, to the actuator for the wheel brake 22 or 23 on the side to which the control stick 13 is operated. This command is emitted based upon information detected by the rudder angle sensor 14 on the direction to the right or left that the pilot operates the control stick 13.

In this case, in the second embodiment, at the same time the ECU 17 outputs a command to the throttle controller 27 such that the throttle opening is increased in order to generate an amount of engine thrust corresponding to the amount of operation of the control stick 13 performed by the pilot. The throttle controller 27 opens the throttle 26 based upon the command from the ECU 17, and the throttle opening is increased for a predetermined amount of time thereby.

As a result, the engine thrust increases temporarily when the aircraft changes direction, and therefore the change of direction movements of the aircraft are supported, and the aircraft can change direction easily and quickly.

Figure 4:
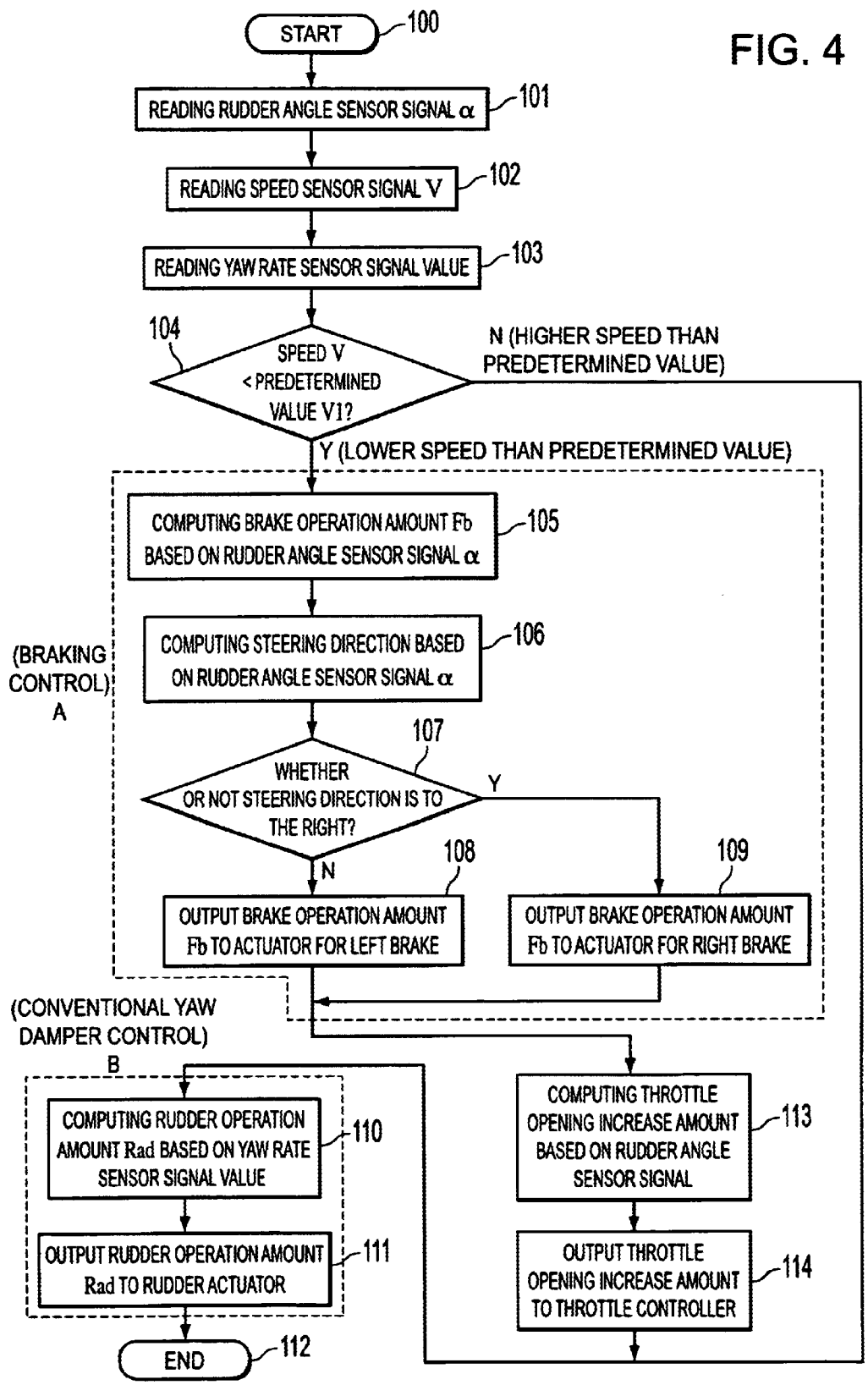
FIG. 4 is a flow chart showing system operation states of the second embodiment of the system and method for controlling traveling direction of an aircraft, according to the present invention.

Next, the aircraft traveling direction control system 40 of the second embodiment is explained based upon a flow chart shown in FIG. 4.

The flow chart is basically the same as the flow chart for the aircraft traveling direction control system 10 of the first embodiment, and is structured with the addition of step 113 and step 114 between the braking control routine A and the yaw damper control routine B.

Therefore, as shown in FIG. 4, processing proceeds to the brake control routine if the ECU 17 determines that the speed V is less than the predetermined value V1 which is standard in Step 104 in the flow chart of the second embodiment. The brake operation amount Fb is calculated based on the input rudder angle sensor signal α (Step 105), the steering direction is determined based on the rudder angle sensor signal α (Step 106), and next it is determined whether or not the steering direction is to the right with respect to the direction of travel of the airframe (Step 107).

If the direction of travel of the aircraft is to the right, then the calculated brake operation amount Fb is output to the brake actuator on the right hand side of the airframe (Step 109), and a braking force acts on the landing gear wheels on the right side of the airframe and therefore the aircraft begins a directional change to the right side of the direction of travel. Further, the brake operation amount Fb is output to the brake actuator on the left side of the airframe for cases in which the ECU 17 determines in Step 107 that the steering direction is not to the right (Step 108). A braking force thus acts on the landing gear wheels on the left side of the airframe, and therefore the airframe begins a directional change to the left side of the direction of travel.

Next, the ECU 17 computes a throttle opening increase amount from the amount that the pilot operates the control stick 13, based on the signal from the rudder angle sensor 14 (Step 113). The calculated amount of throttle opening increase is then output to the throttle controller 27. The throttle 26 is controlled by the throttle controller 27, and the throttle opening of the throttle 26 increases, and therefore the thrust force from the engine increases temporarily when the aircraft turns. The aircraft turning motion is supported thereby, and the aircraft directional change can be performed easily and quickly.

Figure 5:
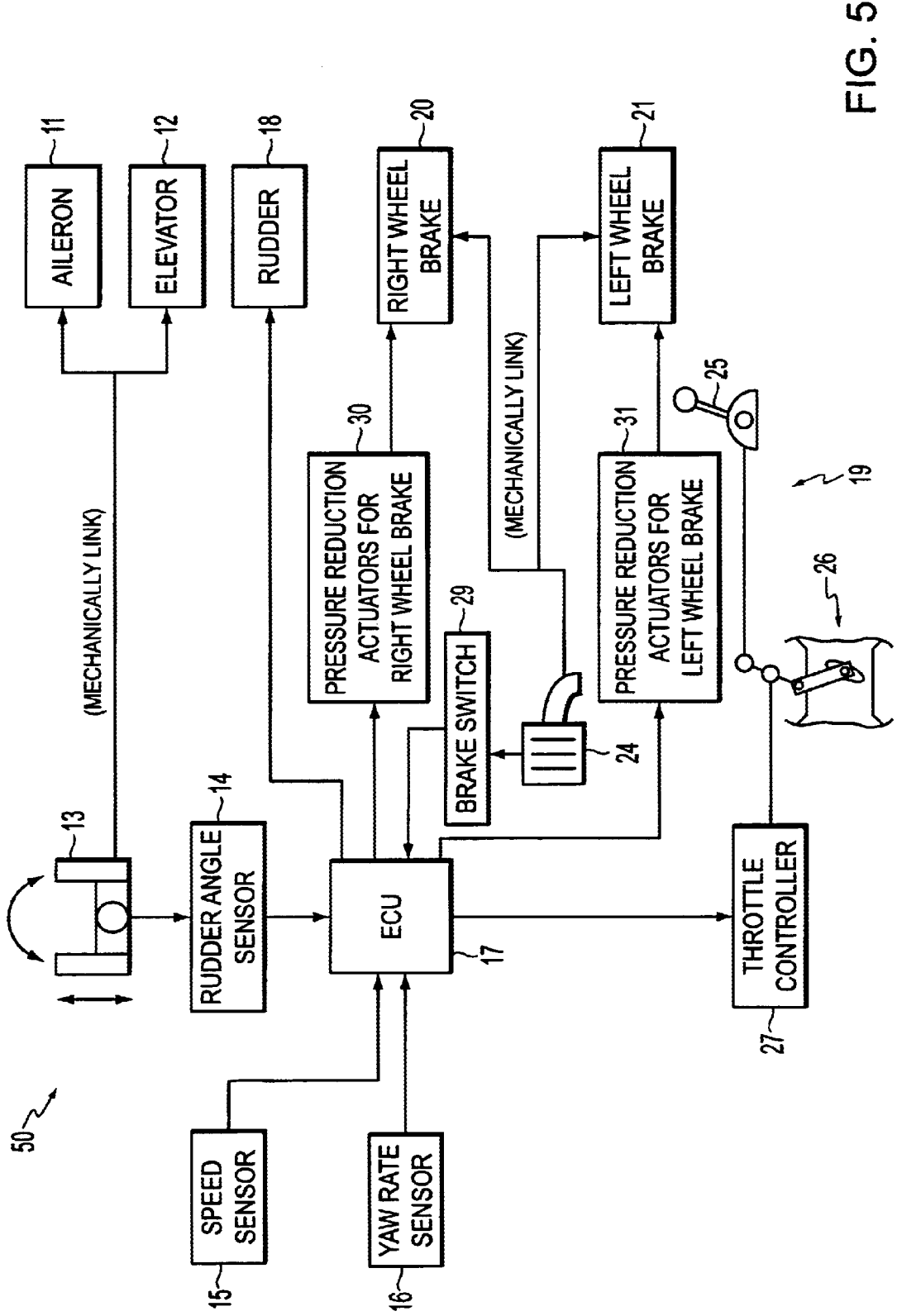
FIG. 5 is a system schematic diagram showing a third embodiment of a system for controlling traveling direction of an aircraft of the present invention.

FIG. 5 shows third embodiment of a system for controlling traveling direction of an aircraft of the present invention. An aircraft traveling direction control system 50 of the third embodiment is based on the structure of the aircraft traveling direction control system 40 of the second embodiment. In addition, it is structured so that, for cases in which the single brake pedal 24 is operated by stepping on it, a lower working pressure is supplied to wheel brake mechanisms on the landing gear wheels mounted on the side of the airframe opposite to the side to which the control stick 13 is operated, than a working pressure supplied to wheel brake mechanisms on the landing gear wheels mounted on the side of the airframe to which the control stick 13 operates. A brake switch 29 that detects brake pedal operation by stepping on the brake pedal is provided in the braking mechanism, and change of direction control of the aircraft is performed by a travel control mechanism 19, with a prerequisite that the brake switch 29 be in an on state.

The brake switch 29 is disposed in the brake pedal 24, and is structured so as to output a detection signal that the brake pedal 24 is operated to the ECU 17 for cases in which the brake pedal 24 is operated by stepping on it. Further, pressure reduction actuators for wheel brake 30 and 31 are structured as control mechanisms for reducing the braking force generated to the wheel brakes 20 and 21.

Accordingly, the ECU 17 calculates the operation direction and the operation amount of the control stick 13 based upon information from the rudder angle sensor 14 when the direction of the aircraft is changed. The either of the pressure reduction actuator for wheel brake 30 or 31 is actuated, which is capable of supplying braking force to the wheels mounted to the landing gear on the side opposite to the direction, right or left, to that the control stick 13 is operated. The braking force for the wheels mounted to the landing gear on the side opposite to the direction to which the control stick 13 is operated is reduced thereby.

As a result, the braking force become large for the wheels on the side to which the control stick 13 is operated, in directions to the right and left of the airframe, relative to the braking force for the wheels on the other side. The direction of the aircraft thus changes to the direction to which the control stick 13 is operated. In addition, yawing control in flight is performed the same as in the first embodiment and the second embodiment.

In the third embodiment, not only the determination of whether or not the airframe speed V is equal to or less than the predetermined value V1 which is standard taken as a condition for beginning airframe change of direction control by using the travel control mechanism 19, but in addition, the determination of whether or not the brake pedal 24 is operated by the pilot stepping down on the break pedal, made by the brake switch 29, is also used. Therefore, it is possible to avoid a dangerous situation in which, for example, because the speed sensor 15 or the ECU 17 operates incorrectly, by the travel control mechanism 19, the braking force is reduced for the wheels on the side opposite to the side in which the aircraft is to change direction, and a directional change is leaded even though the airframe has not yet reached a state in which its speed has been reduced sufficiently, but rather is in an unstable state, even if the aircraft speed V is not less than or equal to the predetermined value V1.

Therefore, in the aircraft control system of the third embodiment, the workload required on the pilot in flight and when running on the ground can be reduced, and a very safe aircraft traveling direction control system, in which a fail-safe is implemented, can be provided.

Operating procedure for the aircraft traveling direction control system 50 of the third embodiment are explained below based upon a flow chart shown in FIG. 6.

Figure 6:
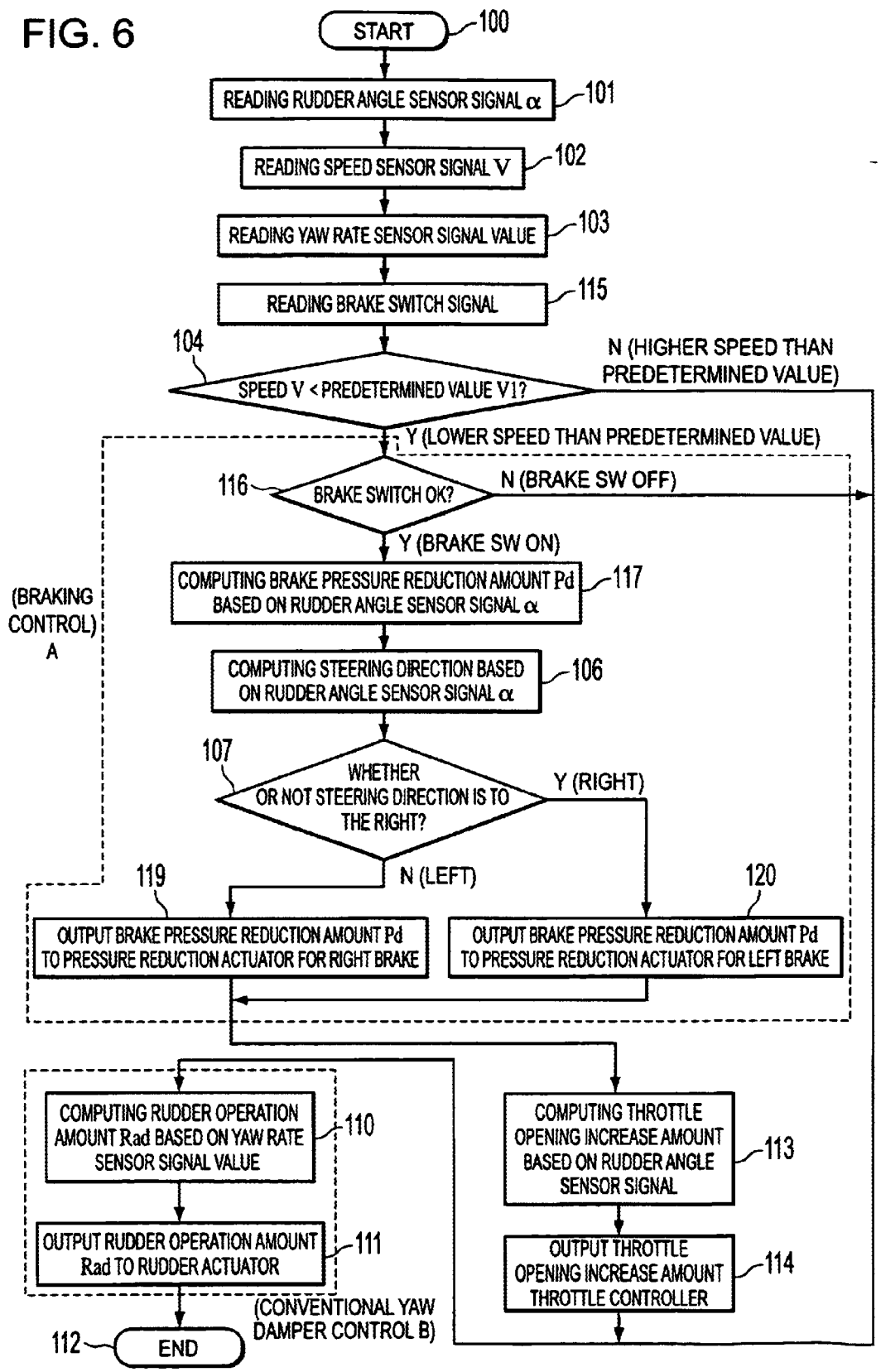
FIG. 6 is a flow chart showing system operation states of the third embodiment of the system and method for controlling traveling direction of an aircraft, according to the present invention.

The flow chart shown in FIG. 6 is basically the same as the flow chart of the aircraft direction of travel control system 40 of the second embodiment that is shown in FIG. 4. However, in the third embodiment Step 115 for inputting a signal showing the open or closed state of the brake switch 29 to ECU 17 is added before Step 104 for performing determination of whether of not the speed V is larger than the predetermined value V1 which is standard.

Further, in contrast to the flow chart shown in FIG. 4, Step 117 for computing a brake pressure reduction amount Pd based on the input rudder angle sensor signal α is provided instead of Step 105 for computing the brake operation amount Fb based on the input rudder angle sensor signal α.

Moreover, Step 120 for outputting the computed brake operation amount Pd to the actuator for brake pressure reduction on the left hand side of the airframe is provided, to which processing proceeds, if it is determined that the steering direction is to the right after judging whether or not the steering direction is to the right direction with respect to the aircraft direction of travel (Step 107). Step 119 for outputting the brake operation amount Pd to the actuator for brake pressure reduction on the right hand side of the aircraft is provided, to which processing proceeds, if the ECU 17 determines that the steering direction is not to the right side in Step 107. Except for the aforementioned different structures, the flow chart of the third embodiment is identical to the flow chart of the second embodiment shown in FIG. 4.

This routine therefore begins (Step 100) in the third embodiment as in the second embodiment above when the pilot turns the ignition switch on. The rudder angle sensor 14, the speed sensor 15, the yaw rate sensor 16, the ECU 17, and the brake switch 29 are all placed in an operational state when the ignition switch is in an on state, and the actuators for wheel brake pressure reduction 30 and 31 are also placed in an operational preparedness state.

In the flow chart shown in FIG. 6, the rudder angle sensor 14 therefore detects the direction and amount of operation of the control stick 13, and outputs the rudder angle sensor signal α to the ECU 17 for cases in which the pilot operates the control stick 13 in a direction to the left or right of the airframe (Step 101). Further, the speed sensor 15 detects a speed of the aircraft V at the appropriate point, and outputs the speed of the aircraft V to the ECU 17 (Step 102). The yaw rate sensor 16 detects an displacement direction and displacement amount of the aircraft in a yawing direction of the airframe at the appropriate point, and outputs a yaw rate sensor signal value to the ECU 17 (Step 103). In addition, the brake switch 29 outputs information relating to whether the brake switch 29 is on or off at an appropriate point to the ECU 17 in the third embodiment.

The ECU 17 determines whether or not the speed V at the appropriate point, input from the speed sensor 15, is larger than the predetermined value V1 that is the basis of whether or not the travel control mechanism 19 operates (Step 104). After comparing the two values, for cases in which it is judged that the speed V at the appropriate point is larger than V1, the ECU 17 judges that it is not necessary for the travel control mechanism 19 to operate, and the aircraft is not in a state of braking, for example it is running at high speed on the runway in order to take off, or the aircraft has taken off and is currently in flight. The brake control routine A is bypassed, and processing moves to the yaw damper control routine B.

In the yaw damper control routine B, the ECU 17 computes a rudder operation amount Rad based on the signal value of the yaw rate sensor 16 (Step 110), and outputs the rudder operation amount Rad to the rudder 18 actuator (Step 111), as stated above. As a result, the rudder 18 is moved by a predetermined angular amount and in a predetermined direction by the yaw damper mechanism, and control of traveling direction in the yawing direction of the airframe is performed automatically without the pilot operating the rudder pedal.

On the other hand, if the ECU 17 determines in Step 104 that the speed V is less than the predetermined value V1 which is standard, processing then moves to the brake control routine A. In the third embodiment, a determination is first made in the brake control routine A as to the information whether or not the brake switch is on, input from the brake switch 29 to the ECU 17 in Step 115(Step 116). If the brake switch 29 is determined to be off, then it is judged that the aircraft is not reduced in speed in Step 104, the brake control routine A is bypassed, and processing moves to the yaw damper control routing B, similar to when the speed of the aircraft V is higher than the predetermined speed V1.

Further if the brake switch 29 is determined to be in an on state in Step 116, aircraft braking has been performed, and processing then advances to Step 117 and below where brake pressure reduction processing is performed. First, the brake pressure reduction amount Pd is computed based on the rudder angle sensor signal α input in Step 101 (Step 117), and the steering direction is determined based on the rudder angle sensor signal α (Step 106). If it is judged whether or not the steering direction is in a direction to the right of the direction of travel of the aircraft (Step 107), and it is determined to be the right direction, then the calculated brake operation amount Pd is output to the actuator for brake pressure reduction 31 on the left side of the airframe (Step 120), and the aircraft begins to change direction toward the right side relative to the direction of travel because the braking force on the landing gear wheels mounted on the right side of the airframe relatively increases thereby.

Further, if the ECU 17 determines that the steering direction is not to the right hand side in Step 107, then the brake operation amount Pd is output to the actuator for brake pressure reduction on the right side of the airframe (Step 119). The airframe thus begins to change direction toward the left side relative to the direction of travel because the braking force to the landing gear wheels mounted on the left side of the airframe relatively increases.

The ECU 17 then calculates a throttle opening increase amount from the amount of operation of the control stick 13 by the pilot, based upon a signal from the rudder angle sensor 14 (Step 113). Next, the throttle opening increase amount is output to the throttle controller 27 (Step 114). The throttle 26 is controlled by the throttle controller 27, and thus the throttle opening increases. The engine thrust therefore temporarily increases when the aircraft direction changes, and this supports the aircraft change of direction. The aircraft directional change can therefore be performed easily and quickly.

In this case, the speed of the aircraft is determined to be equal to or less then the predetermined value V1 in Step 104, and the brake switch is on and the aircraft is determined to be in a state following landing in Step 116. Therefore the yaw damper control routine B is passed without being performed, and this routine is completed (Step 112).

Figure 7:
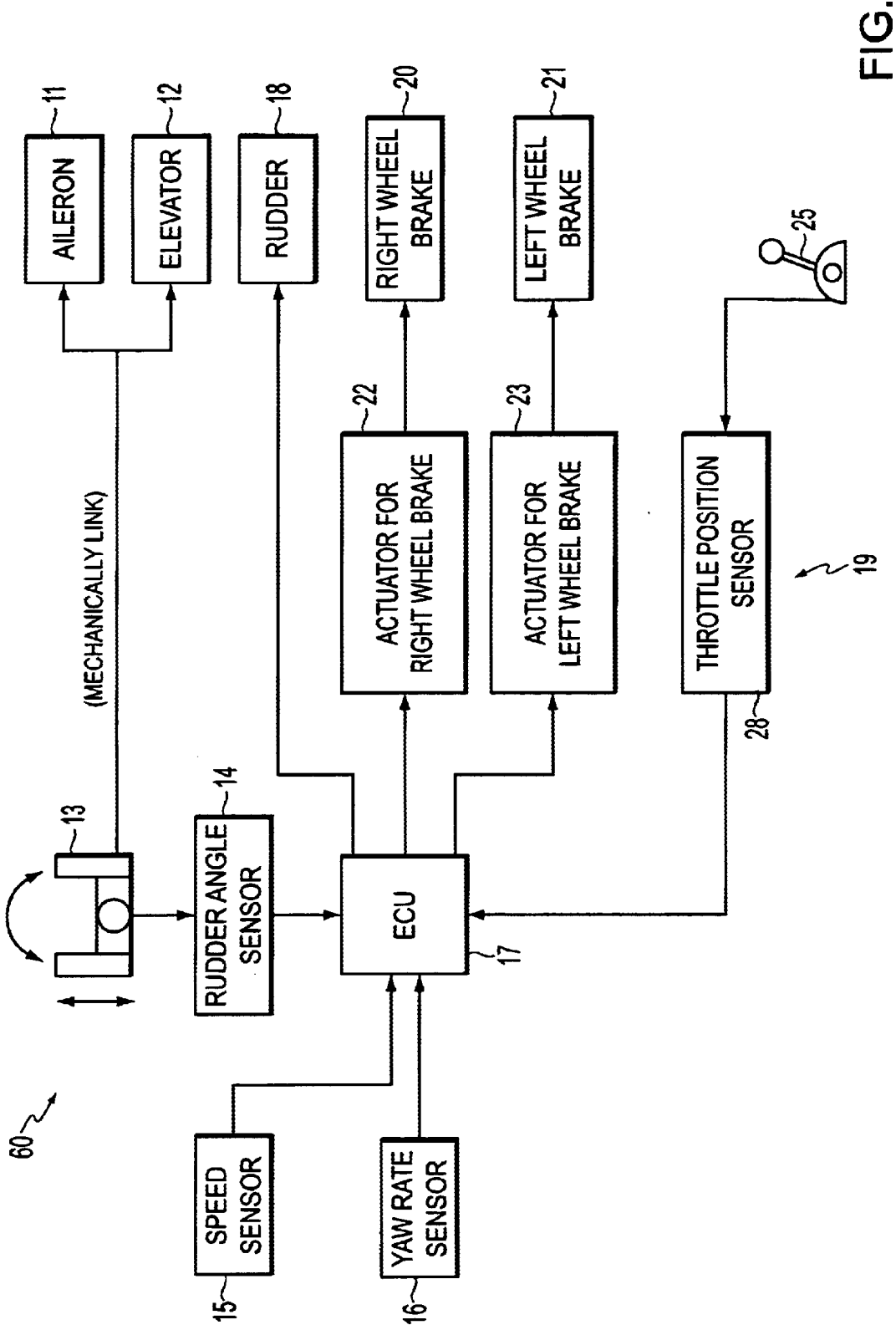
FIG. 7 is a system schematic diagram showing a fourth embodiment of a system for controlling traveling direction of an aircraft of the present invention.

Next, a system for controlling traveling direction of an aircraft of the fourth embodiment of the present invention is explained using FIG. 7.

An aircraft traveling direction control system 60 of the fourth embodiment differs from the systems 10, 40, and 50 in the first to third embodiments above. The aircraft traveling direction control system 60 is structured such that braking acts on both landing gear wheels according as flare out operation of the control stick, in which a pilot pulls back the control stick to the side of pilot, when the pilot brakes the aircraft on the ground, without the pilot manually operating the brake pedal by stepping on it. Braking operation itself can thus be made automatic.

In fourth embodiment, the structure of the aircraft traveling direction control system 10 of the first embodiment above is assumed to be used, and in addition, the aircraft traveling direction control system 60 of the fourth embodiment is structured so as to perform braking of all wheels installed on all of a plurality of landing gear mounted on the right and left sides of the airframe for cases in which the aircraft has landed. At this time, flare out operation of the control stick 13 is taken as a condition.

The single brake pedal 24 established in the first to third embodiments is therefore not established in the fourth embodiment. As a result, in the fourth embodiment, flare out operation of the control stick 13 is detected by the rudder angle sensor 14 for cases in which the pilot performs flare out operation of the control stick 13 in order to raise a nose of the airframe during landing. This information detected by the rudder angle sensor 14 is output to the ECU 17, and the ECU 17 outputs commands to both the actuator for right wheel brake 22 and to the actuator for left wheel brake 23. The right wheel brake 20 and the left wheel brake 21 are thus operated, and braking of the airframe is performed.

Further, a throttle position sensor 28 capable of detecting a throttle opening of the throttle lever 25 is provided in the fourth embodiment. With this structure, information relating to the throttle opening detected by the throttle position sensor 28 is input to the ECU 17. Determination as to whether or not the airframe is in a landing condition is therefore judged by the ECU 17 based upon the information relating to the throttle opening from the throttle position sensor 28.

In other words, although this flare out operation is also performed when takeoff because the pilot also pulls back the control stick 13 towards the pilot when taking off to raise the nose of the airframe, distinction between takeoff and landing is made as stated above based upon the throttle opening information detected by the throttle position sensor 28. It is determined that the aircraft is in a state of landing, if flare out operation is being performed and the throttle opening is equal to or less than a predetermined value. In addition, if it is determined that the speed of the aircraft is equal to or less than a predetermined value, braking of both of the landing gear wheels on the right and left side is performed 19, and then braking of either of the landing gear wheels on the right or left side based on the direction and amount of operation of the control stick is also performed by the travel control mechanism. Control for the change direction of travel of the aircraft is performed thereby.

Flare out is also performed when taking off, but the throttle opening is open nearly all the way when taking off, and therefore the braking of the aircraft is not performed, and control of the aircraft traveling direction is not performed by the travel control mechanism 19, taking the determination of the speed of the aircraft as a precondition.

The rudder angle sensor 14 therefore detects flare out operation of the control stick 13, and this information is output to the ECU 17 in the fourth embodiment for cases in which the pilot performs flare out operation of the control stick 13 in order to raise the nose of the airframe when landing. In this case the ECU 17 takes into consideration information relating to the aircraft speed of the aircraft from the speed sensor 15 and relating to the throttle opening from the throttle position sensor 28, and then determines whether or not the aircraft is in a landed state. If it is judged that the aircraft is in a landed state, then a braking force is imparted to both brakes for cases in which the speed of the aircraft is larger than a predetermined value, thus braking of aircraft is performed, and control of the aircraft traveling direction is performed by the travel control mechanism 19 for cases in which the speed of the aircraft is equal to or less than the predetermined value.

It is therefore not necessary to perform yawing control of the aircraft by using the rudder pedal in flight in the fourth embodiment. Furthermore, when the aircraft is running on the ground after landing, a braking force is imparted automatically to the wheels of both landing gear, and the travel speed of the aircraft is made be reduced thereby, for cases in which flare out operation of the control stick is performed and in which the throttle opening is equal to or less than a predetermined value and the speed of the aircraft is equal to or larger than a predetermined value. Thereafter, if it is necessary to change the direction of the aircraft, then an appropriate braking force is supplied automatically to the left or right wheels according to the operation of the control stick in the left or right direction.

As a result, not only does a conventional brake pedal become unnecessary in the fourth embodiment, but the single rudder pedal used in each of the previous the first to third embodiments also becomes unnecessary. The pilot is freed completely from control operations using his or her feet, both in flight and after landing, and therefore it becomes possible to further reduced the workload related to steering the aircraft in flight and after landing.

In particular, it is conventionally necessary for the pilot to perform flare out operation of the control stick 13 by hand and wheel braking operations and change of direction operations by operating the rudder pedals by using both feet. In accordance with the fourth embodiment, only the control stick 13 operations performed by hand need be done. In particular, it becomes possible to make the complex steering control operations for landing easier, and landing operation can be made very safe.

Operation procedures of the aircraft traveling direction control system 60 of the fourth embodiment are explained below based on a flow chart shown in FIG. 8.

Figure 8:
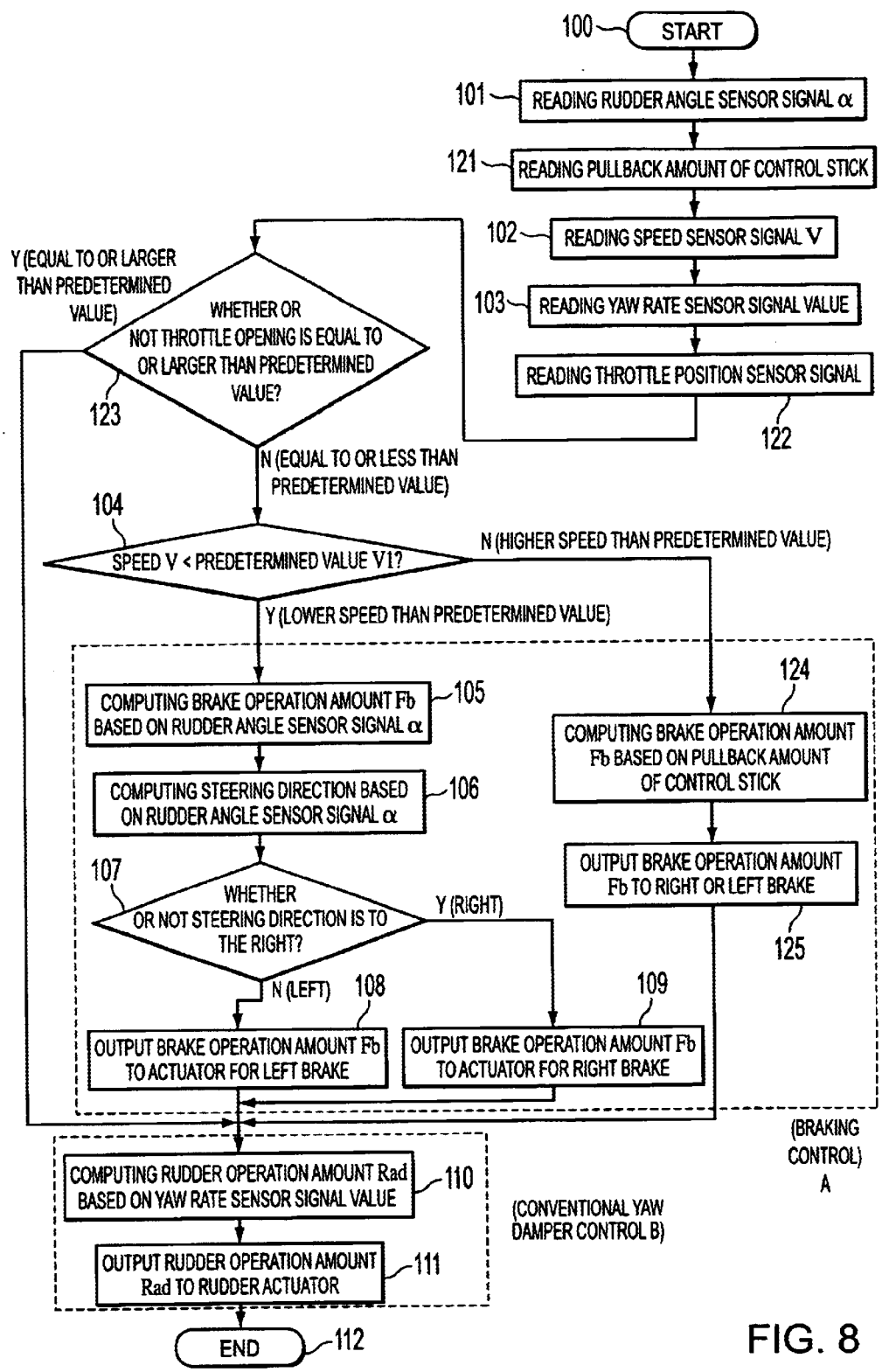
FIG. 8 is a flow chart showing system operation states of the fourth embodiment of the system and a method for controlling traveling direction of an aircraft, according to the present invention.

The flow chart shown in FIG. 8 is based on the flow chart of the aircraft traveling direction control system 10 of the first embodiment above, which is shown in FIG. 2. In addition, the following points have been added:

1) Step 121 of inputting information to the ECU 17 relating to the amount that the control stick is pulled back in flare out operations of the control stick 13;
2) Step 122 of inputting information to the ECU 17 relating to the throttle opening from the throttle position sensor 28;
3) Step 123 of determining whether or not the throttle opening is equal to or larger than a predetermined value;
4) Step 124 of computing the brake operation amount Fb based on the pullback amount of control stick in Step 121 above for cases in which the throttle opening is equal to or less than a predetermined value in Step 123 and in which the speed of the aircraft is larger than a predetermined value; and
5) Step 125 of outputting the brake operation amount Fb to the wheel brakes on both the right and left side landing gear, based upon Step 124.

This routine therefore begins when the above-mentioned ignition switch is placed in an on state (Step 100). The rudder angle sensor 14, the speed sensor 15, the yaw rate sensor 16, the throttle position sensor 28, and the ECU 17 described above are all placed in an operational state, and the actuators for wheel brake 22 and 23 are also placed in an operational preparation state.

Therefore, for cases in which the pilot operates the control stick 13 in the right or left hand directions of the airframe, the direction and the amount of the control stick 13 operation is detected by the rudder angle sensor 14, and the rudder angle sensor signal $\alpha$ is output to the ECU 17 (Step 101).

The rudder angle sensor 14 detects the amount that the pilot pulls back on the control stick 13 toward the pilot for cases in which the pilot performs flare out operation of the control stick 13, and then outputs this information to the ECU 17 (Step 121).

The speed sensor 15 detects the speed V of the aircraft at the corresponding point and outputs information as to the speed to the ECU 17 (Step 102), and the yaw rate sensor 16 detects the displacement direction and the displacement amount of the aircraft in the yawing direction of the airframe at the corresponding point, and outputs a yaw rate sensor signal value to the ECU 17 (Step 103). Further, in the fourth embodiment the throttle position sensor 28 detects the throttle opening of the throttle 25 at the corresponding point, and outputs this information to the ECU 17 (Step 122).

Information necessary for operating the aircraft traveling direction control system 60 of the fourth embodiment is thus input to the ECU 17 by passing through these steps.

The ECU 17 then determines whether or not the throttle opening value of the throttle position sensor 28 input in Step 122 is equal to or larger than a predetermined value (Step 123). If the throttle opening value is equal to or larger than the predetermined value, then the ECU 17 determines that the aircraft is taking off or is in flight, the brake control routine A is by bypassed, and processing moves to the yaw damper control routine B. Yawing control of the rudder 18 of the vertical tail is performed in Steps 110 and 111 by the yaw damper mechanism, similar to the case of the first embodiment.

On the other hand, for cases in which the throttle opening is determined to be less than the predetermined value in Step 123 above, the ECU 17 judges that the aircraft is in a landed state, and next determines whether or not the speed V of the aircraft is equal to or less then the predetermined value V1 at the corresponding point. For cases in which it is determined that the speed of the aircraft V is equal to or less than the predetermined value V1 in Step 104, it is judged that the aircraft has slowed down after landing to a speed at which change of direction is possible, or it is judged that the aircraft is moving at a predetermined speed before takeoff. Processing proceeds to Step 105, and control of the left or right hand side wheel brake is performed by the travel control mechanism 19, thus control of traveling direction is performed.

On the other hand, if the speed of the aircraft is larger than the predetermined value V1 at the corresponding point, the brake operation amount Fb for the right and left landing gear wheels is computed from the information signal input to the ECU 17 in Step 121 which is relating to the amount that the control stick 13 is pulled back, detected by the rudder angle sensor 14 (Step 124). The operation amount Fb is output to the right and left wheel brakes, and braking of the aircraft is performed (Step 125). As a result, the travel speed of the airframe on the ground decreases.

In this case the aircraft is judged to not be in a state of flight by determining that the throttle opening is equal to or less than the predetermined value in Step 123 above and by determining that the speed of the aircraft is equal to or larger than the predetermined speed V1 in Step 104 above. The yaw damper control routine B is therefore passed, and the routine is completed at this point (Step 112).

This routine is repeated at extremely short time intervals in this case, and proceeds in sequence from starting Step 100 until reaching Step 112, as described above. The routine therefore returns to the start (Step 100), and begins to proceed from Step 101. The speed sensor signal V is then output to the ECU 17 from the speed sensor 15 (Step 102), and then a determination is again made as to whether or not the speed of the aircraft V is equal to or less than the predetermined value V1 at the corresponding point (Step 104).

If the speed of the aircraft V at the corresponding point is determined to be equal to or less than the predetermined value V1 as a result of the aircraft slowing down, then processing proceeds to Step 105. In this step, either of the left or the right wheel brake, is controlled by the travel control mechanism 19, thus control of traveling direction is performed.

The brake operation amount Fb is computed in Step 105 based on the rudder angle sensor signal α input to the ECU 17, and it is determined in Step 106 based on the rudder angle sensor signal α to which direction, the left or the right, the control stick 13 is operated. Next, it is determined whether the control stick 13 is operated to the right hand direction (Step 107), and if so, then the necessary amount of brake operation Fb is output to the actuator for the right wheel brake 22 (Step 109). If the control stick 13 operation is not in the right hand direction, then the necessary amount of brake force Fb is output to the left wheel brake actuator 21 (Step 108). The aircraft changes direction automatically toward the direction to which the pilot operates the control stick 13 by outputting the brake operation amount Fb.

Thereafter, it is determined in Step 123 that the throttle opening is equal to or less than a predetermined value, and in Step 104 it is determined that the speed of the aircraft V is equal to or less than the predetermined value V1, and therefore the yaw damper control routine B is passed, and the above routine is completed (Step 112).

Figure 9:
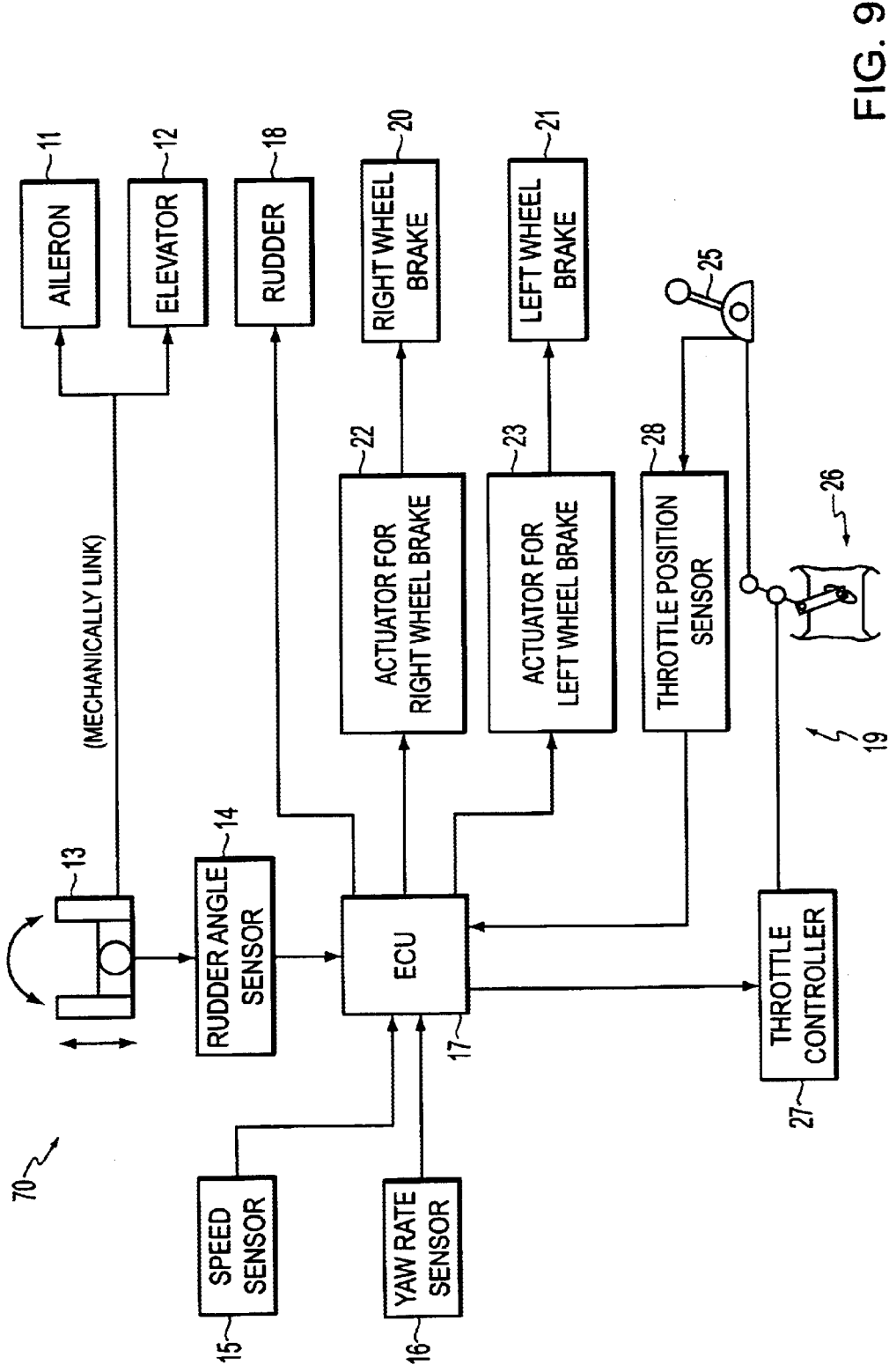
FIG. 9 is a system schematic diagram showing a fifth embodiment of a system for controlling traveling direction of an aircraft of the present invention.

FIG. 9 shows fifth embodiment of a system for controlling traveling direction of an aircraft of the present invention. The throttle controller 27 which is the same as that of the second embodiment and the third embodiment is added to the structure of the aircraft traveling direction control system 60 of the fourth embodiment above, in a system for controlling traveling direction of an aircraft 70 of the fifth embodiment.

Therefore, similar to the second and third embodiments, the system of the fifth embodiment is structured such that the throttle controller 27 is established in the above-mentioned travel control mechanism 19, which is capable of controlling the engine throttle opening so as to become larger for cases in which a larger braking force acts on the landing gear wheels mounted on the side of the airframe to which the control stick is operated, than a braking force acting on the landing gear wheels mounted on the opposite side.

The throttle controller 27 is structured to be capable of automatically controlling the throttle 26 that is operated manually by the pilot using the throttle lever 25. The point that the throttle controller 27 is operated by commands from the ECU 17 is the same as the cases of the second embodiment and the third embodiment.

Therefore, in the fifth embodiment, similar to the fourth embodiment, for cases in which the pilot performs flare out operation of the control stick 13 in order to raise the nose of the airframe when landing, and in which it is determined that the throttle opening is equal to or less than a predetermined value and that the airframe is in a landed state, if the speed of the aircraft is larger than a predetermined value, a braking force is therefore automatically imparted to both the right and left brakes, thereby braking of the aircraft is performed without the pilot using his or her feet for braking, if the speed of the aircraft is equal to or less then a predetermined value, then control of traveling direction is performed by the travel control mechanism 19.

Namely, the ECU 17 outputs a command capable of making generate a necessary braking force to either of the actuator for the wheel brake 22 or 23, the one on the side to which the control stick 13 is operated, based upon information on the direction of operation of the control stick 13 by the pilot which is detected by the rudder angle sensor 14.

In this case the ECU 17 simultaneously outputs a command to increase the throttle opening to the throttle controller 27 so as to generate an amount of thrust corresponding to the amount that the pilot operates the control stick 13 according to this embodiment. The throttle controller 27 thus opens the throttle 26 based on the command from the ECU 17, and the throttle opening is increased during a predetermined period of time.

As a result, braking operations using one's feet become completely unnecessary in the fifth embodiment due to the automatic aircraft braking operations performed by the pilot operating the control stick 13 for flare out operation. The workload on the pilot relating to aircraft steering in flight and after landing is therefore reduced. In addition, the engine thrust is temporarily increased when changing direction of the aircraft in the fifth embodiment, supporting turning operations of the aircraft, and thus airframe directional changes can be performed easily and quickly.

Figure 10:
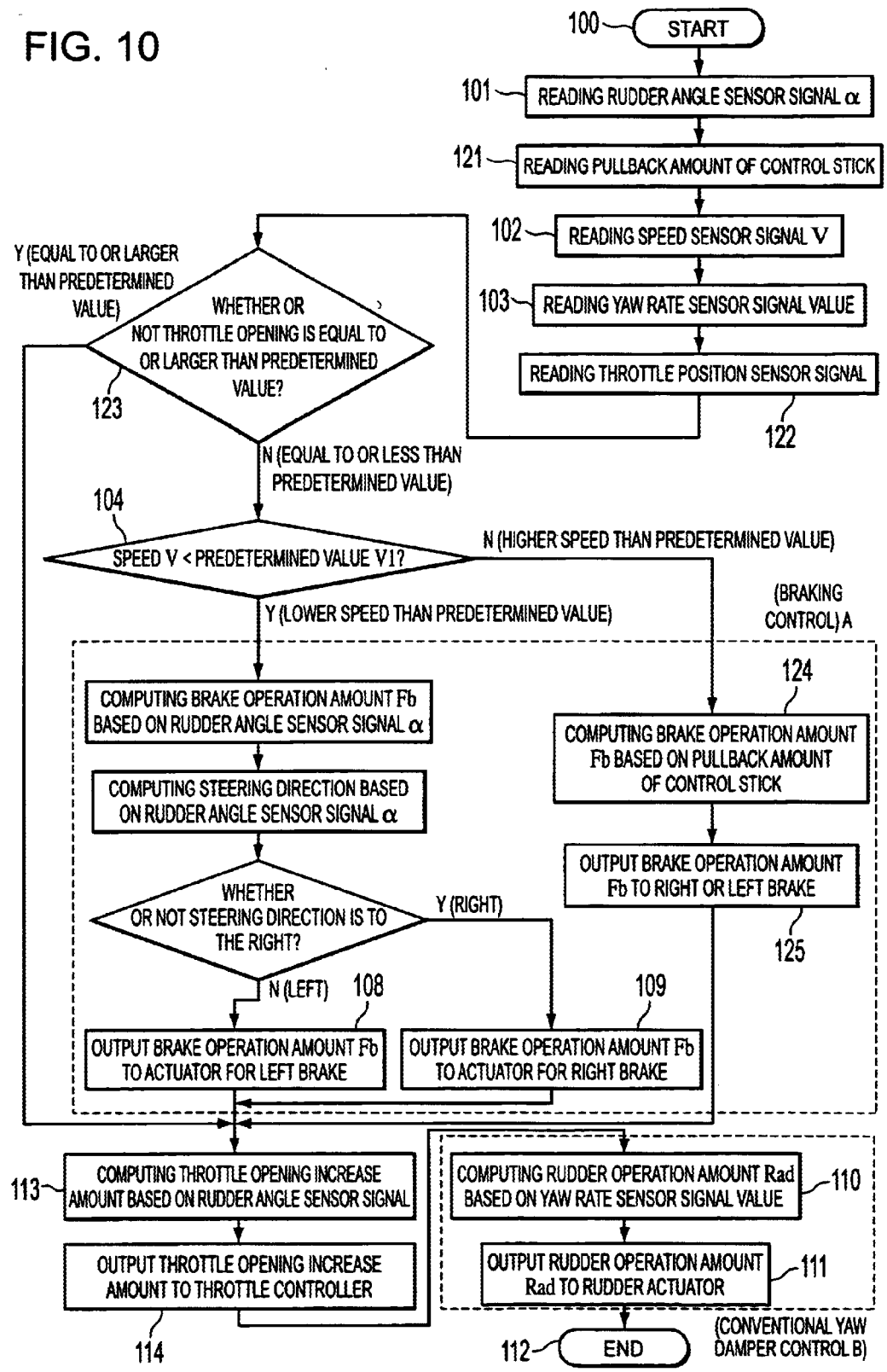
FIG. 10 is a flow chart showing system operation states of the fifth embodiment of the system and a method for controlling traveling direction of an aircraft, according to the present invention.

Next, operation of the aircraft traveling direction control system 70 of the fifth embodiment is explained based on a flow chart shown in FIG. 10.

The flow chart of FIG. 10 is basically the same as that of the aircraft traveling direction control system 60 of the fourth embodiment. In the fifth embodiment, steps 113 and 114 relating to thrust increase when changing of direction of the aircraft are added between the brake control routine A and the yaw damper control routine B.

The operation procedures are therefore basically the same as those of the flow chart in the fourth embodiment above. Namely, the brake operation amount Fb is computed in Step 105 based on the rudder angle sensor signal α, and it is determined in Step 106 based on the rudder angle sensor signal α in which direction to the left or right the control stick 13 is operated. In Step 107, judgment is made as to whether or not the control stick operation direction is to the right, and if so, then the necessary amount of brake operation Fb is output to the actuator for the right wheel brake 22 (Step 109). If the control stick 13 direction of operation is not to the right, then the necessary amount of brake operation Fb is output to the actuator for the left wheel brake 21 (Step 108). Change of the direction of travel of the aircraft toward the direction to which the control stick 13 is operated thus begins.

The ECU 17 calculates an amount of throttle opening increase at this time in the fifth embodiment from the amount that the pilot operates the control stick 13, based upon a signal from the rudder angle sensor 14 (Step 113). The calculated amount of throttle opening increase is then output to the throttle controller 27 (Step 114).

The throttle 26 is controlled by the throttle controller 27 and the throttle opening therefore increases. The engine thrust thus increases temporarily during change of direction of the aircraft, turning operations of the aircraft are supported thereby, and thus the aircraft directional change can be performed easily and quickly.

Note that for cases in which it is determined in Step 123 that the throttle opening is larger than the predetermined value, the aircraft is judged to be in a state of flying at that point, Steps 113 and 114 above are passed, and processing moves to the yaw damper control routine B.

Furthermore, for cases in which it is determined in Step 104 that the speed of the aircraft V is equal to or larger than the predetermined value V1, a braking force is supplied to both the right and left wheel brakes 20 and 21 through Steps 124 and 125, similar to the fourth embodiment. In this case, operation of the control stick in the left or right hand direction of the airframe in order to change the direction of the aircraft is not yet performed, and therefore processes for calculating the amount of throttle opening increase in Steps 113 and 114 based on the rudder angle signal are not performed. Steps 113 and 114 are skipped, and in addition, the yaw damper control routine B is also skipped. Processing in this routine is thus complete (Step 112).

Thereafter, as stated above, processing returns to the start (Step 100), and the routine once again proceeds from Step 101. The speed sensor signal V is input to the ECU 17 from the speed sensor 15 (Step 102), and then a determination is made again as to whether or not the speed V of the aircraft at this point is equal to or less than the predetermined value V1 (Step 104). If the speed V of the aircraft V at the corresponding point is determined to be equal to or less than the predetermined value V1 as a result of the speed V of the aircraft slowing down in Step 125 above, then processing proceeds to Step 105. The either of the left or the right wheel brake is braked by the travel control mechanism 19, thus control of traveling direction is performed, as described above.

Figure 11:
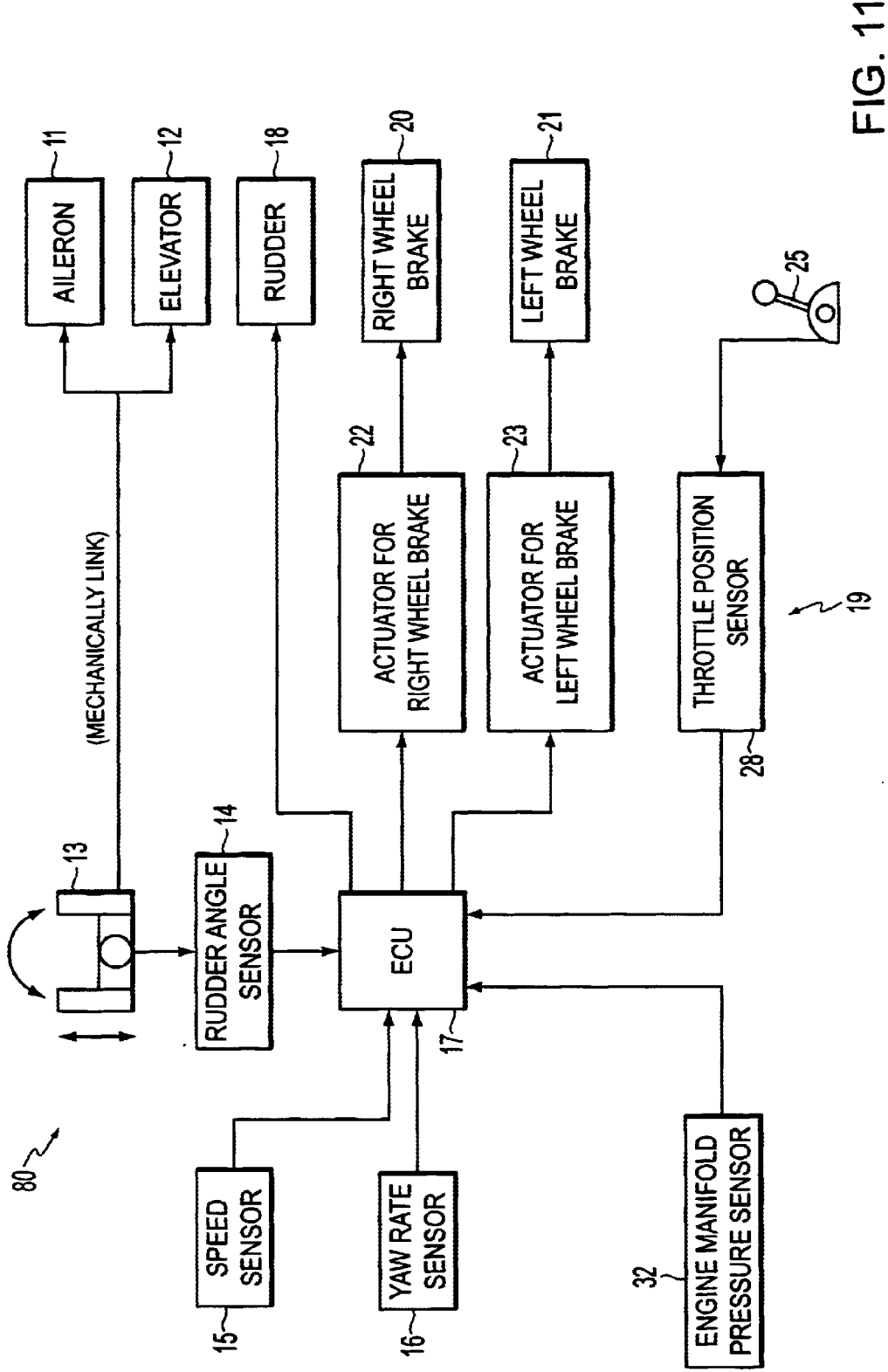
FIG. 11 is a system schematic diagram showing a sixth embodiment of a system for controlling traveling direction of an aircraft of the present invention.

FIG. 11 shows sixth embodiment of a system for controlling traveling direction of an aircraft of the present invention. An aircraft traveling direction control system 80 of the sixth embodiment is based on the aircraft traveling direction control system of the fourth embodiment above, and has a failsafe capable of responding to cases in which the throttle position sensor 28 operates incorrectly.

That is, an engine manifold pressure sensor 32 is also established, as shown in FIG. 11, in addition to the throttle position sensor 28 in the aircraft traveling direction control system 80 of the sixth embodiment.

The sixth embodiment is structured such that the both of them are necessary that the throttle opening detected by the throttle position sensor 28 is equal to or less than a predetermined value, and that an engine manifold pressure detected by the engine manifold pressure sensor 32 is equal to or less than a predetermined value, taking the following as prerequisite conditions: brake control of the aircraft by imparting a braking to the right and left pair of wheel brakes using the travel control mechanism 19, or performing direction change of the direction of travel of the aircraft by increasing the braking force to either of the wheel brakes.

Therefore, if the throttle sensor 28 operates incorrectly so that it outputs to the ECU 17 a detection signal signifying that the throttle position is larger than a predetermined value, even though the throttle opening is actually equal to or less than the predetermined value, the brake control routine A is bypassed in the fourth embodiment above, as shown in FIG. 8, and processing moves to the yaw damper control routing B so that the travel control mechanism 19 does not operate.

As a result, there is the possibility of a situation in which, for example, braking does not act on the wheels regardless of the fact that the aircraft has actually landed and is traveling on the runway. In this case, it becomes a situation in which it is completely impossible to brake the aircraft with the aircraft traveling direction control system 60 of the fourth embodiment because the brake pedal 24 is not provided and the pilot therefore cannot apply braking manually.

However, in the sixth embodiment, it is judged whether or not the aircraft is in a landed state based on information from the engine manifold pressure sensor 32 in addition to information from the throttle position sensor 28, and control of the operation of the travel control mechanism 19 is thus performed.

As a result, by the aircraft traveling direction control system 80 of the sixth embodiment it becomes possible to prevent a situation in which there is no braking operation regardless of the fact that the aircraft has landed, with malfunction of the throttle position sensor 28 as the cause as described above.

Figure 12:
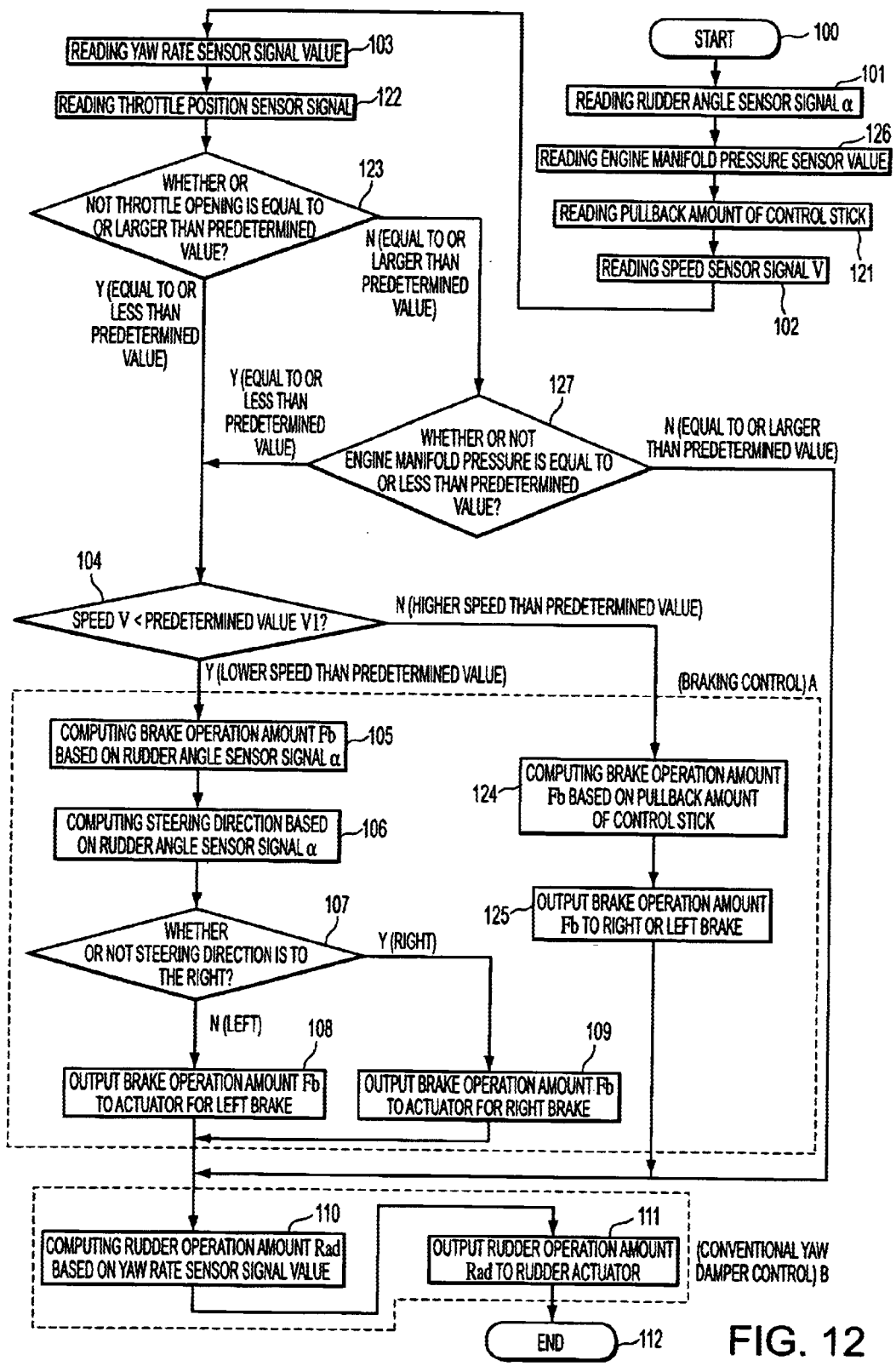
FIG. 12 is a flow chart showing system operation states of the sixth embodiment of the system and a method for controlling traveling direction of an aircraft, according to the present invention.

Next, operation of the aircraft traveling direction control system 80 of the sixth embodiment is explained based upon a flow chart shown in FIG. 12.

This flow chart is basically the same as the flow chart for the aircraft traveling direction control system 60 of the fourth embodiment shown in FIG. 8. Step 126 is added in the sixth embodiment. The engine manifold pressure value detected by the engine manifold pressure sensor 32 is output to the ECU 17 in the sixth embodiment. Information relating to the engine manifold pressure value is becomes a factor, along with information on the rudder angle sensor signal α (Step 101), the speed of the aircraft V (Step 102), the amount that the control stick is pulled back (Step 121), and the throttle opening (Step 122) for judging the start of the brake control routine A by the ECU 17.

Further, Step 127 is added between Step 123 and Step 104. In the case where in Step 123, the throttle opening is determined to be equal to or larger than a predetermined value, a determination is further made in Step 127 regarding whether or not the engine manifold pressure detected by the engine manifold pressure sensor 32 is equal to or greater than a predetermined value from a failsafe point of view. A judgment is also made on the state of the engine power, from the standpoint of the engine manifold pressure, and a determination of whether or not the aircraft is in a landed state at this point is made.

Therefore, even for cases in which it is determined that the throttle opening is equal to or larger than a predetermined value in Step 123, in addition, a determination is also made as to whether or not the engine manifold pressure is equal to or less than a predetermined value in Step 127. If the engine manifold pressure is judged to be equal to or less than a predetermined value, then processing proceeds to Step 104, and the brake control routine A begins by the travel control mechanism 19 through a determination of the aircraft speed V of the aircraft.

In Step 127, if the engine manifold pressure is determined to be equal to or larger than the predetermined value in this case, the aircraft is judged to be in a state of flight, the brake control routine A is bypassed, and processing moves to the yaw damper control routine B.

Other flowchart composition and operation procedures are the same as the flow chart shown in FIG. 8 for the aircraft traveling direction control system 40 of the fourth embodiment.

Figure 13:
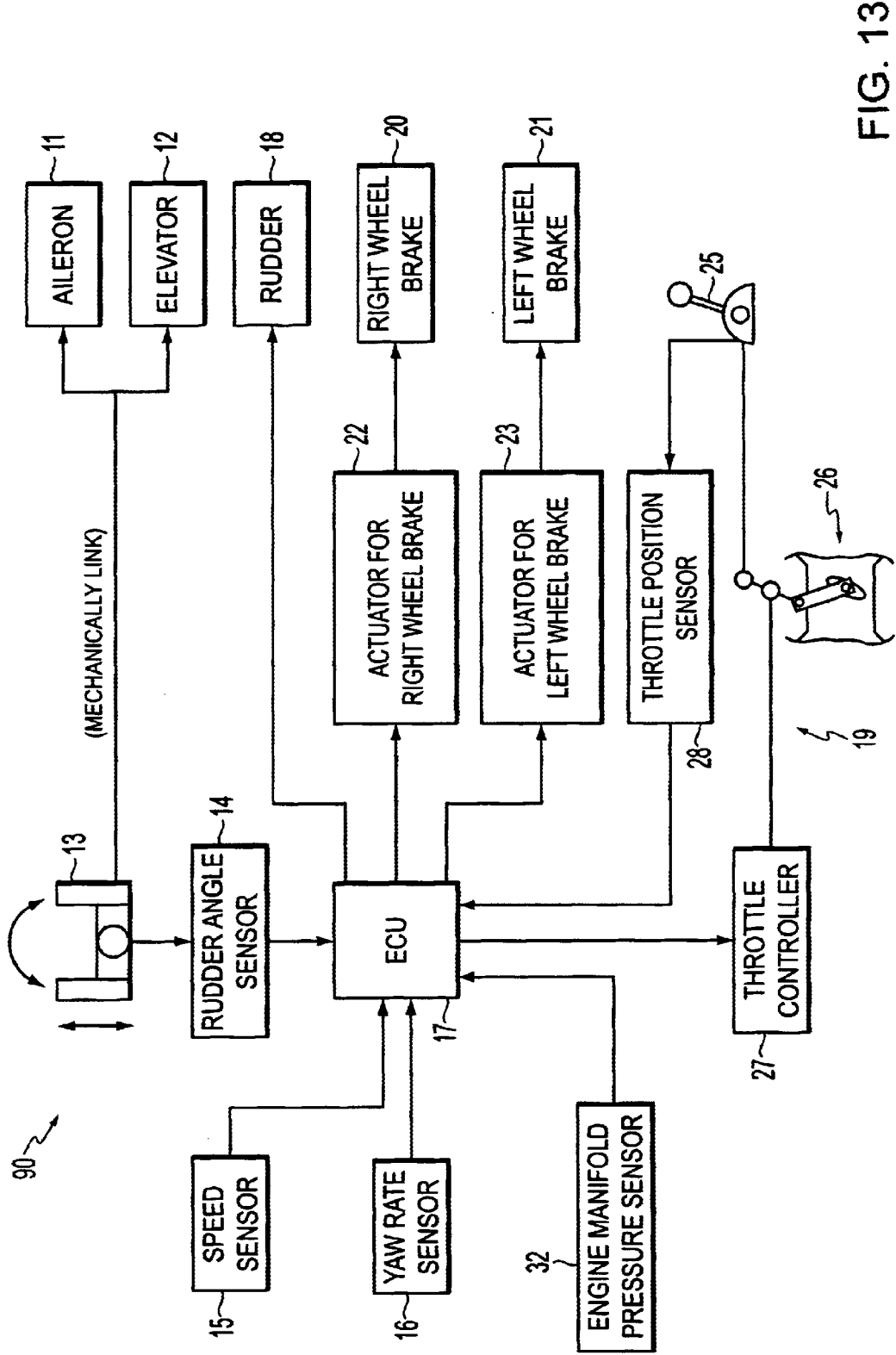
FIG. 13 is a system schematic diagram showing a seventh embodiment of a system for controlling traveling direction of an aircraft of the present invention.

FIG. 13 shows a system for controlling traveling direction of an aircraft in accordance with seventh embodiment of the present invention, and is a variation example to the aircraft traveling direction control system 80 shown in FIG. 11 as described above.

That is, as shown in FIG. 13, a system for controlling traveling direction of an aircraft 90 of the seventh embodiment has the throttle controller 27 established similar to the aircraft systems for controlling traveling direction of an aircraft 20, 32, and 50 of the second, third, and fifth embodiments respectively.

The throttle controller 27 is established so as to be capable of making the engine throttle opening become larger in the seventh embodiment for cases in which a larger braking force acts on the landing gear wheels mounted on the side of the airframe in the direction to which the control stick 13 is operated than a braking force acting on the landing gear wheels mounted on the side opposite to the direction of operation of the control stick, similar to the systems for controlling traveling direction of an aircraft 20, 32, and 50 of the second, third, and fifth embodiments respectively.

The throttle controller 27 is structured so as to be capable of automatically controlling the throttle 26 which is operated manually by a pilot using the throttle lever 25. The throttle controller 27 is similar to the cases of the second, third, and fifth embodiments respectively in that it is driven by a command from the ECU 17.

Figure 14:
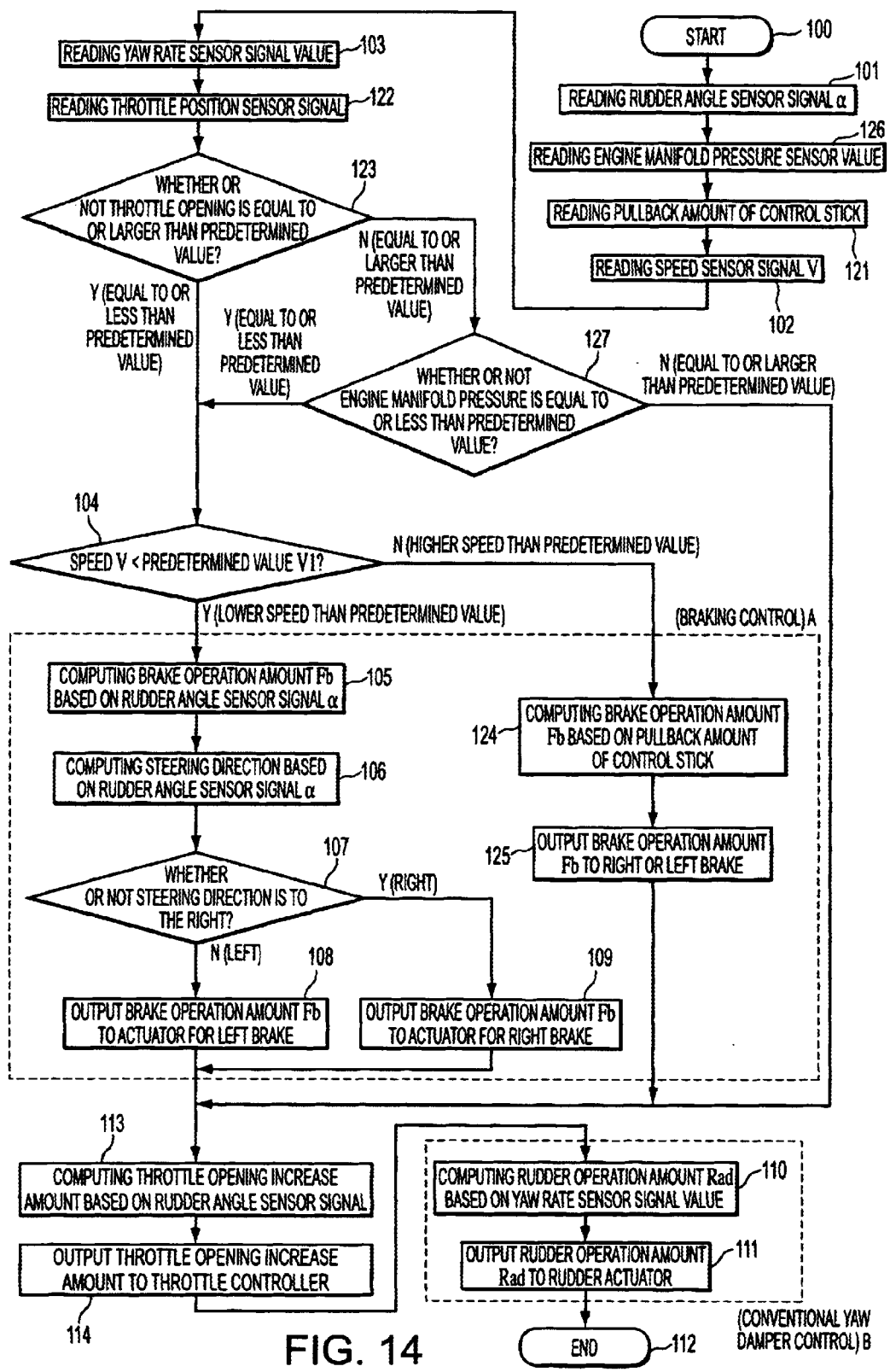
FIG. 14 is a flow chart showing system operation states of the seventh embodiment of the system and a method for controlling traveling direction of an aircraft, according to the present invention.
Figure 15:
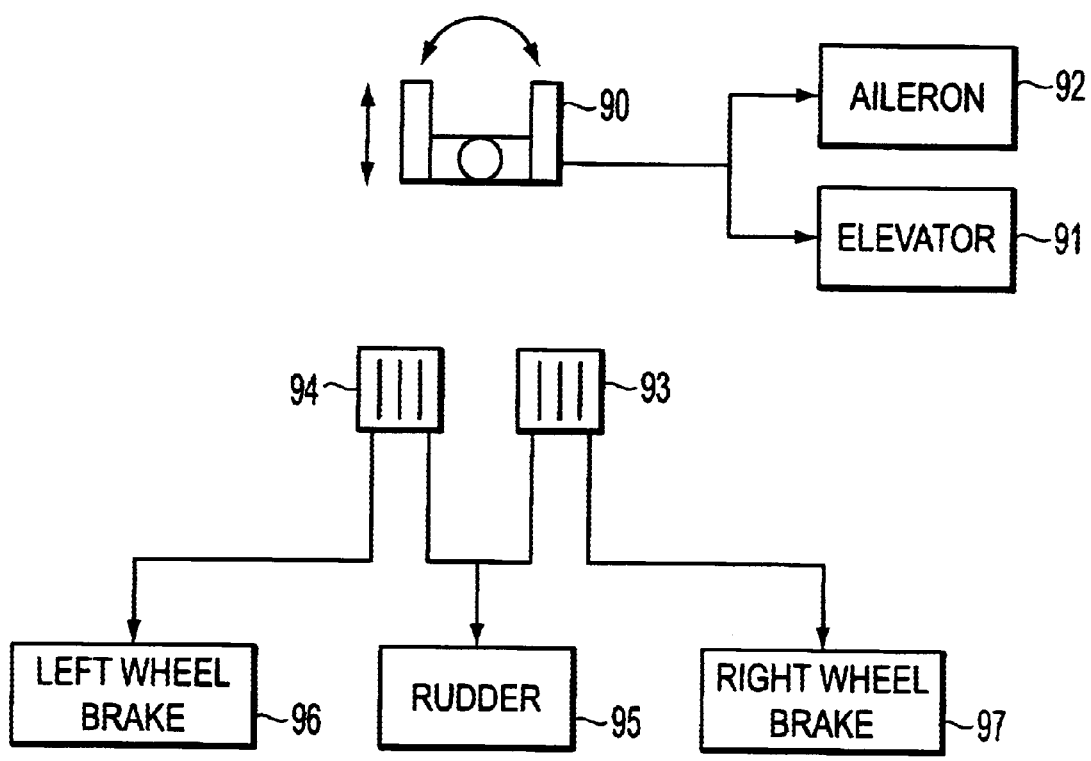
FIG. 15 is a diagram showing a system in a conventional aircraft for operating elevators and ailerons by using a control stick, and operating a rudder and right and left wheel brakes by using rudder pedals.

Continuing the explanation while referring to the flow chart of FIG. 14, in the seventh embodiment, Steps 113 and 114 are added, with respect to the flow chart of the aircraft traveling direction control system 80 shown in FIG. 12, between the brake control routine A and the yaw damper control routine B in order to control the throttle controller 27 capable of making the throttle opening increase corresponding to the amount of operation of the control stick 13 in the right or left hand directions. Other portions are exactly the same as the flow chart shown in FIG. 12.

Therefore, if the pilot performs flare out operation of the control stick 13 in order to raise the nose of the airframe when landing (Step 121), processing proceeds to the brake control routine A of the travel control mechanism 19 for cases in which the aircraft is judged to be in a landed state, namely when: it is determined that the throttle opening is equal to or less than a predetermined value, based upon information from the throttle position switch (Steps 122 and 123); it is determined that the engine manifold pressure is equal to or less than a predetermined value (Steps 126 and 127); and in addition, the speed V of the airframe is equal to or less than the predetermined value V1 (Step 104).

In this case, if the speed of the aircraft is found to be equal to or greater than the predetermined value (Step 104), then the brake operation amount Fb is computed based on the amount that the control stick 13 is pulled back, input in Step 121 above (Step 124), a braking force is automatically imparted to both the right and left brakes in accordance with the brake operation amount Fb (Step 125), and aircraft braking is performed without pilot action.

For cases in which this brake control is performed, the throttle opening increase control of Steps 113 and 114, and the yaw damper control routine B in Steps 110 and 111 are skipped, as in each of the previous embodiments, and processing again returns to the starting step 100. Next, control of the aircraft traveling direction is performed by the travel control mechanism 19 in Steps 105 to 109 for cases in which the speed V of the aircraft at the corresponding point is determined to be equal to or less than the predetermined value V1 in Step 104.

On the other hand, control of aircraft traveling direction is performed by the travel control mechanism 19 if the speed of the aircraft V is found to be equal to or less than the predetermined value V1 (Step 104) in Step 104. Namely, the ECU 17 outputs a command such that a necessary amount of braking force can be generated to the either the actuator for the wheel brake 22 or 23, in the direction to which the control stick 13 is operated, based upon information regarding operation of the control stick 13 by the pilot, to the left or right direction, detected by the rudder angle sensor 14 (Steps 105, 106, 107, 108, and 109).

The ECU 17 simultaneously computes a throttle opening increase amount based on the rudder angle sensor signal α input in Step 101 (Step 119), and outputs the amount of increase to the throttle controller 27 for cases in which control of aircraft traveling direction is performed in the seventh embodiment.

As a result, the workload on the pilot relating to aircraft steering is reduced in the seventh embodiment in flight and after landing, because the braking operations of the aircraft is automatically performed, due to the pilot performing flare out operation of the control stick 13, and thus operation procedures using one's feet are completely unnecessary. Further, it becomes possible to perform very safe braking of the aircraft because a failsafe is established with respect to erroneous operation of the throttle position sensor 28 by also referring to the engine manifold pressure value, not only the throttle opening value, when judging whether or not the aircraft has landed. In addition, the engine thrust force increases temporarily when making changes of direction to the airframe, and therefore aircraft turning is supported thereby and thus change of direction of the airframe can be performed easily and quickly.

Note that the scope of the present invention relating to this patent application is not limited to the respective aforementioned embodiments.

What is claimed is:

1. A system for controlling traveling direction of an aircraft that is installed with a plurality of landing gear on right and left sides of its airframe,
    wherein a larger braking force is applied to landing gear wheels on a side toward which the control stick is operated than a braking force acting on landing gear wheels on the other side, in the case of a control stick being operated toward the right or left side directions of the airframe.

2. A system for controlling traveling direction of an aircraft according to claim 1, the aircraft being installed with a plurality of landing gear on right and left sides of its airframe, comprising: a detection means capable of detecting an operation state of a control stick; and
    a braking mechanism capable of supplying braking force to each of the plurality of landing gear wheels on the right and left sides,
    wherein a larger braking force is supplied by the braking mechanism to landing gear wheels on a side toward a direction of which the control stick is operated than is supplied to landing gear wheels on the other side, based upon the operation state of the control stick detected by the detection means, for cases in which the control stick is operated toward the right or left side directions of the airframe.

3. A system for controlling traveling direction of an aircraft according to claim 1, comprising a single brake pedal installed within a cockpit of an aircraft, which is capable of simultaneously performing braking of a plurality of landing gear wheels mounted on the right and left sides of an airframe,
    wherein braking of the aircraft is performed by operating the single brake pedal.

4. A system for controlling traveling direction of an aircraft according to claim 3,
    wherein the working pressure applied to a braking mechanism for landing gear wheels mounted on a side that is opposite to the side to which a control stick is operated is set to become less than the working pressure applied to a braking mechanism for landing gear wheels mounted on the side to which the control stick is operated, in the cases in which the single brake pedal has been stepped on and thus the speed of an aircraft has become equal to or less than the predetermined speed.

5. A system for controlling traveling direction of an aircraft according to claim 4, comprising detection means for detecting the stepping operation on the single brake pedal,
    wherein the working pressure applied to a braking mechanism for landing gear wheels mounted on a side that is opposite to the side to which a control stick is operated is set to become lower than the working pressure applied to a braking mechanism for landing gear wheels mounted on the side to which the control stick is operated, when it is determined by the detection means that the brake pedal has been stepped on and braking has been thus effected.

6. A system for controlling traveling direction of an aircraft according to claim 3,
    wherein a single braking pedal capable of supplying braking force to the wheels installed on landing gear is mounted within a cockpit of an aircraft instead of rudder pedals, and a yaw damper mechanism is installed in an airframe so that automatic yawing control of a rudder installed in a vertical tail of the aircraft is performed while the aircraft is in flight.

7. A system for controlling traveling direction of an aircraft according to claim 6,
    wherein the detection means capable of detecting the operation state of a control stick is capable of detecting the direction of control stick operation as well as the amount of control stick operation, and braking force is applied to braking mechanisms for wheels mounted to the landing gears on the right and left sides of an airframe, based upon information relating to the direction and the amount of control stick operation if the control stick is operated to the left or right side of the airframe.

8. A system for controlling traveling direction of an aircraft according to claim 1, further comprising a detection means being capable of detecting the operation state of the control stick,
    wherein performance of flare out operation of a control stick is taken as a condition to perform braking of a plurality of right and left side landing gear wheels mounted on an airframe, for cases in which the detection means that is capable of detecting the operation state of the control stick detects flare out operation as the aircraft lands.

9. A system for controlling traveling direction of an aircraft according to claim 1, comprising detection means capable of detecting speed of an aircraft,
    wherein a larger braking force can be made to act on landing gear wheels on a side toward which a control stick is operated, as compared with that acting on landing gear wheels on the other side, for cases in which the aircraft speed of the aircraft is judged to be equal to or less than a predetermined speed based upon speed information detected by the detection means.

10. A system for controlling traveling direction of an aircraft according to claim 9,
    wherein a working pressure supplied to a braking mechanism for landing gear wheels mounted on a side to which a control stick is operated is made larger than a working pressure supplied to a braking mechanism for landing gear wheels mounted on the side opposite to the side to which the control stick is operated.

11. A system for controlling traveling direction of an aircraft according to claim 9,
    wherein an engine throttle opening is controlled to become larger for cases in which a braking force acting on landing gear wheels mounted on a side to which a control stick is operated is larger than the braking force acting on landing gear wheels mounted on the opposite side, based upon information from the detection means capable of detecting operation of the control stick.

12. A system for controlling traveling direction of an aircraft according to claim 1, comprising detection means capable of detecting a housing state of landing gear,
wherein a larger braking force is made to act on landing gear wheels on a side toward which a control stick is operated, as compared with that acting on landing gear wheels on the other side, in the case of the landing gear being determined to be projected from an airframe based on information detected by the detection means.

13. A system for controlling traveling direction of an aircraft according to claim 1, comprising detection means capable of detecting speed of an aircraft and detection means capable of detecting a landing gear housing state,
wherein a larger braking force acts on landing gear wheels on a side toward which a control stick is operated than that acting on landing gear wheels on the other side, when the landing gear is projected from the airframe and the aircraft is determined to be traveling at or below the predetermined speed, based upon information from both of the detection means.

14. A system for controlling traveling direction of an aircraft according to claim 1, comprising detection means capable of detecting engine throttle opening,
wherein in cases where it is determined that the engine throttle opening is equal to or less than a predetermined value based on information detected by the detection means, a larger braking force can be made to act on landing gear wheels on a side toward which a control stick is operated than the braking force applied to landing gear wheels on the other side.

15. A system for controlling traveling direction of an aircraft according to claim 1, comprising detection means capable of detecting aircraft engine manifold pressure,
wherein a larger braking force can be made to act on landing gear wheels on a side toward which a control stick is operated as compared with that applied to landing gear wheels on the other side, for cases in which the manifold pressure is determined to be equal to or less than a predetermined value based on information detected by the manifold pressure detection means.

16. A method of controlling traveling direction of an aircraft that is installed with a plurality of landing gear on the right and left sides of its airframe, comprising the steps of:
detecting a direction of operation and an amount of operation of a control stick which is performed by a pilot in a direction to the right or left side of the airframe;
detecting the speed of the aircraft; and
determining whether or not the speed of the aircraft is equal to or less than a predetermined value,
wherein the method further comprises the steps of:
determining the side, when the speed of the aircraft is less than or equal to the predetermined value, to which the direction of travel of the aircraft is to be changed, based on the direction of operation of the control stick,
computing an amount of brake operation based on the amount of operation of the control stick; and
supplying the computed amount of braking to landing gear wheels mounted on the side of the airframe to which the direction of travel is to be changed.

17. A method of controlling traveling direction of an aircraft according to claim 16, further comprising a step of detecting a displacement direction and a displacement amount of the aircraft in a yawing direction of the airframe,
wherein when the speed of the aircraft is judged to be larger than the predetermined value, the method further comprises the step of computing an amount of operation of rudder provided in a vertical tail of the airframe based on the displacement direction and the displacement amount of the aircraft in the yawing direction, and then operating the rudder based on the amount of rudder operation.

18. A method of controlling traveling direction of an aircraft according to claim 16, further comprising a step of computing an amount of throttle opening of engine increase based upon the direction and the amount of the control stick operation by the pilot in the right or left directions of the airframe,
wherein for cases in which the computed amount of braking operation is supplied to the landing gear wheels on the side to which the aircraft is to change its direction of travel, the throttle is controlled based on the computed amount of throttle opening increase.

19. A method of controlling a direction of travel of an aircraft according to claim 16, further comprising the steps of:
detecting an amount of flare out operation of the control stick by the pilot;
detecting a throttle opening;
determining whether or not the throttle opening is equal to or larger than a predetermined value; and
computing an amount of braking operation based on the amount of flare out operation for cases in which the throttle opening is equal to or less than a predetermined value and the speed of the aircraft is equal to or larger than a predetermined value,
wherein the computed amount of braking operation is supplied to all of the landing gear wheels mounted on the right and left sides of the airframe.

20. A method of controlling a direction of travel of an aircraft according to claim 16, further comprising the steps of:
detecting engine manifold pressure;
determining whether or not the throttle opening is equal to or larger than a predetermined value;
determining whether or not the engine manifold pressure is equal to or less than a predetermined value in a case where the throttle opening is judged to be equal to or larger than the predetermined value; and
computing an amount of braking operation based on the amount of flare out operation, in a case where the throttle opening is equal to or larger than the predetermined value of throttle opening, the engine manifold pressure is equal to or less than the predetermined value of engine manifold pressure, and the speed of the aircraft is equal to or larger than a predetermined value,
wherein the computed amount of braking operation is supplied to all of the landing gear wheels mounted on the right and left sides of the airframe.

21. A method of controlling a direction of travel of an aircraft that is installed with a plurality of landing gear on the right and left sides of its airframe, the method comprising steps of:
detecting a direction and an amount of operation of a control stick performed by a pilot in a direction to the right or left side of the airframe;
detecting the speed of the aircraft;

detecting that braking operations have been performed by the pilot; and determining whether or not the speed of the aircraft is equal to or less than a predetermined value, wherein the method further comprises the steps of:
- determining, based on the direction of operation of the control stick, to which side of the aircraft the direction of travel is to be changed, when the speed of the aircraft is less than or equal to the predetermined value and it is determined that the braking operations have been performed;
- computing an amount of braking pressure reduction based on the amount of operation of the control stick for cases in which the braking operations have been performed; and
- supplying the computed amount of braking pressure reduction to landing gear wheels mounted on the side of the airframe that is opposite to the side to which the direction of travel is to be changed.

22. A method of controlling traveling direction of an aircraft according to claim 21, further comprising a step of computing a throttle opening increase amount based on the direction and amount of operation of a control stick performed by a pilot in direction to the right or left of the airframe, wherein the throttle is controlled based on the computed throttle opening increase amount for cases in which the computed amount of braking pressure reduction is supplied to the landing gear wheels mounted on the side of the airframe that is opposite to the side to which the direction of travel is to be changed.

* * * * *